US012752503B2

(12) United States Patent
Pütz et al.

(10) Patent No.: US 12,752,503 B2
(45) Date of Patent: Oct. 6, 2026

(54) METHOD OF PROVIDING REFRACTIVE MICROSTRUCTURES ON A SURFACE OF A SPECTACLE LENS AND SPECTACLE LENS DESIGN

(71) Applicant: Carl Zeiss Vision International GmbH, Aalen (DE)

(72) Inventors: Jörg Pütz, Aalen (DE); Marc Stroisch, Aalen (DE); Martin Reese, Aalen (DE); Thomas Glöge, Schorndorf (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/973,285

(22) Filed: Dec. 9, 2024

(65) Prior Publication Data

US 2025/0100239 A1 Mar. 27, 2025

Related U.S. Application Data

(63) Continuation of application No. PCT/EP2023/065077, filed on Jun. 6, 2023.

(30) Foreign Application Priority Data

Jun. 14, 2022 (EP) .................................... 22178842

(51) Int. Cl.

*B29D 11/00* (2006.01)
*G02C 7/02* (2006.01)
*G02C 7/06* (2006.01)

(52) U.S. Cl.

CPC .. *B29D 11/00326* (2013.01); *B29D 11/00028* (2013.01); *B29D 11/00317* (2013.01);

(Continued)

(58) Field of Classification Search

CPC ................................................ B29D 11/00317

See application file for complete search history.

(56) References Cited

U.S. PATENT DOCUMENTS 6,089,713 A 7/2000 Hof et al.
8,162,477 B2 4/2012 Carimalo et al.

(Continued)

FOREIGN PATENT DOCUMENTS

CN 104678572 A 6/2015
CN 104761679 A 7/2015

(Continued)

OTHER PUBLICATIONS

Office Action by the Chinese Patent Office (SIPO) issued in CN 202380047180.6, which is a counterpart hereof, mailed on Mar. 29, 2015, and English-language translation thereof.

(Continued)

*Primary Examiner* — Alison L Hindenlang
*Assistant Examiner* — Alexander A Wang
(74) *Attorney, Agent, or Firm* — Qubit IP, PLLC

(57) ABSTRACT

A method of providing refractive microstructures on a surface of a spectacle lens body by an additive manufacturing process is provided, in which the refractive microstructures are formed by applying and curing a curable material. The process includes forming a layer of a first liquid or viscous curable material and an additional amount of the first curable material or an amount of a second liquid or viscous curable material at locations at which the refractive microstructures shall be formed before curing or pinning the at least one first curable material. Protrusions formed by the additional first curable material or the second curable material are levelled out by material transport processes within (Continued)

the liquid or viscous material in the layer of the at least one curable material. In addition, a spectacle lens with refractive microstructures is provided.

20 Claims, 6 Drawing Sheets

(52) U.S. Cl.
CPC .. *B29D 11/00355* (2013.01); *B29D 11/00442* (2013.01); *G02C 7/022* (2013.01); *G02C 7/028* (2013.01); *G02C 7/061* (2013.01)

(56) References Cited

U.S. PATENT DOCUMENTS

| | | | |
|---|---|---|---|
| 8,807,747 | B2 | 8/2014 | Guilloux et al. |
| 8,833,936 | B2 | 9/2014 | Varnas |
| 10,571,717 | B2 | 2/2020 | Neitz et al. |
| 2003/0152694 | A1* | 8/2003 | Bergstedt ......... B29D 11/00365 427/162 |
| 2011/0267576 | A1 | 11/2011 | Kratzer et al. |
| 2012/0257161 | A1 | 10/2012 | Varnas |
| 2013/0092229 | A1* | 4/2013 | Xue .................... H10F 77/1696 136/256 |
| 2013/0286073 | A1* | 10/2013 | Blessing ............... B29C 64/112 347/14 |
| 2015/0086754 | A1* | 3/2015 | Van De Vrie .......... B33Y 10/00 264/308 |
| 2015/0331254 | A1 | 11/2015 | Guilloux |
| 2015/0331255 | A1 | 11/2015 | Sankaridurg |
| 2016/0054588 | A1 | 2/2016 | Brennan et al. |
| 2016/0306192 | A1 | 10/2016 | Marshall et al. |
| 2017/0027691 | A1 | 2/2017 | Richter et al. |
| 2017/0131567 | A1 | 5/2017 | To et al. |
| 2017/0227788 | A1 | 8/2017 | Griffin et al. |
| 2017/0276961 | A1 | 9/2017 | Wooley et al. |
| 2018/0065302 | A1* | 3/2018 | Arai ....................... B29C 64/245 |
| 2018/0129072 | A1 | 5/2018 | Aschwanden et al. |
| 2018/0157062 | A1 | 6/2018 | Asami et al. |
| 2019/0227342 | A1 | 7/2019 | Brennan et al. |
| 2019/0353925 | A1* | 11/2019 | Biskop ................... G02C 7/022 |
| 2020/0073147 | A1 | 3/2020 | Bakaraju et al. |
| 2020/0331209 | A1* | 10/2020 | Ong ....................... B33Y 10/00 |
| 2021/0001578 | A1 | 1/2021 | Nykerk |
| 2021/0354409 | A1 | 11/2021 | Guillot et al. |
| 2021/0356763 | A1 | 11/2021 | Le Saux et al. |
| 2022/0146857 | A1 | 5/2022 | Hones, Jr. et al. |
| 2022/0244567 | A1 | 8/2022 | Qi et al. |
| 2023/0041524 | A1* | 2/2023 | Lecompere ...... B29D 11/00009 |
| 2023/0161078 | A1* | 5/2023 | Biteau .............. B29D 11/00009 351/159.57 |

FOREIGN PATENT DOCUMENTS

| | | | |
|---|---|---|---|
| CN | 104884999 | A | 9/2015 |
| CN | 111796364 | A | 10/2020 |
| EP | 0 857 993 | A2 | 8/1998 |
| EP | 1 034 453 | B1 | 3/2003 |
| EP | 2 115 527 | A0 | 11/2009 |
| EP | 2 383 603 | A2 | 11/2011 |
| EP | 2 069 854 | B1 | 4/2015 |
| EP | 3 553 594 | A1 | 10/2019 |
| EP | 3 561 578 | A1 | 10/2019 |
| EP | 3 640 713 | A1 | 4/2020 |
| EP | 3 640 714 | A1 | 4/2020 |
| WO | 9/726579 | A1 | 7/1997 |
| WO | 2007/041796 | A1 | 4/2007 |
| WO | 2009/129528 | A1 | 10/2009 |
| WO | 2010/129465 | A1 | 11/2010 |
| WO | 2011/054058 | A1 | 5/2011 |
| WO | 2018/026697 | A1 | 2/2018 |
| WO | 2018/076057 | A1 | 5/2018 |
| WO | 2018/156402 | A1 | 8/2018 |
| WO | 2019/166653 | A1 | 9/2019 |
| WO | 2019/166654 | A1 | 9/2019 |
| WO | 2019/166655 | A1 | 9/2019 |
| WO | 2019/166657 | A1 | 9/2019 |
| WO | 2019/166659 | A1 | 9/2019 |
| WO | 2019/206569 | A1 | 10/2019 |
| WO | 2020/113212 | A1 | 6/2020 |
| WO | 2021/059887 | A1 | 4/2021 |
| WO | 2021/209527 | A1 | 10/2021 |
| WO | 2021/214197 | A1 | 10/2021 |

OTHER PUBLICATIONS

Werner Köppen, "Konzeption und Entwicklung von Progressivgläsern," Deutsche Optiker Zeitung DOZ Oct. 1995, pp. 42 to 46, May 1995 (English-language translation attached).

Edwards et al., "The Hong Kong Progressive Lens Myopia Control Study: Study Design and Main Findings," Investigative Ophthalmology & Visual Science, vol. 43, No. 9, pp. 2852 to 2858, Sep. 2002.

Gwiazda et al., "A Randomized Clinical Trial of Progressive Addition Lenses versus Single Vision Lenses on the Progression of Myopia in Children," Investigative Ophthalmology & Visual Science, vol. 44, No. 4, pp. 1492 to 1500, Apr. 2003.

Charman et al., "Peripheral refraction and the development of refractive error: a review," Ophtalmic and Physiological Optics, vol. 30, Issue 4, pp. 321 to 338, Jul. 2010.

Jung et al., "Prevalence of Myopia and its Association with Body Stature and Educational Level in 19-Year-Old Male Conscripts in Seoul, South Korea," Investigative Ophthalmology & Visual Science, vol. 53, No. 9, pp. 5579 to 5583, Aug. 2012.

Wong et al., "Epidemiology and Disease Burden of Pathologic Myopia and Myopic Choroidal Neovascularization: An Evidence-Based Systematic Review," American Journal of Ophthalmology, Perspective, vol. 157, Issue 1, pp. 9 to 25, Jan. 2014.

Hasebe et al., "Myopia Control With Positively Aspherized Progressive Addition Lenses: A 2-Year, Multicenter Randomized, Controlled Trial," Investigative Ophthalmology & Visual Science, vol. 55, pp. 7177 to 7188, Nov. 2014.

Holden et al., "Global Prevalence of Myopia and High Myopia and Temporal Trends from 2000 through 2050," Ophthalmology, vol. 123, Issue 5, pp. 1036 to 1042, May 2016.

Industrial Norm "Ophthalmic optics—Spectacle lenses—Vocabulary (ISO 13666:2019)," English version EN ISO ISO 13666:2019, Dec. 2019.

Extended European Search Report issued in EP 22 178 842.5, to which this application claims priority, mailed on Dec. 2, 2022.

International Search Report and Written Opinion issued in PCT/EP2023/065077, to which this application claims priority, mailed Aug. 29, 2023.

International Preliminary Report on Patentability issued in PCT/EP2023/065077, to which this application claims priority, mailed Apr. 18, 2024.

Office Action by the European Patent Office (EPO) issued in EP 23 728 814.7, which is a counterpart hereof, mailed on Jun. 24, 2025.

* cited by examiner

METHOD OF PROVIDING REFRACTIVE MICROSTRUCTURES ON A SURFACE OF A SPECTACLE LENS AND SPECTACLE LENS DESIGN

CROSS REFERENCE TO RELATED APPLICATIONS

This application is a continuation application of international patent application PCT/EP2023/065077, filed on Jun. 6, 2023 and designating the U.S., which claims priority to European patent application 22 178 842.5, filed on Jun. 14, 2022, all of which are hereby incorporated by reference in their entireties.

TECHNICAL FIELD

The present disclosure relates to a method of providing refractive microstructures like lenslets, ring-shaped focusing structures, structures with a refractive index distribution, or similar on a surface of a spectacle lens, in particular, a spectacle lens for slowing down or stopping progression of myopia. In addition, the disclosure relates to a spectacle lens design with microstructures, in particular, a spectacle lens design for slowing down or stopping progression of myopia.

BACKGROUND

In many East Asian countries myopia has reached epidemic proportions with some large urban centers reporting close to 100% incidence of myopia among 18-19 year olds (Jung S-K, Lee J H, Kakizaki H, et al.: Prevalence of myopia and its association with body stature and educational level in 19-year-old male conscripts in Seoul, South Korea. Invest. Ophthalmol. Vis. Sci. 2012; 53: 5579-5583.). It has been estimated that there have been around 2 billion myopes worldwide in 2010 and some of the recent epidemiological modelling suggests that this number will increase to 5 billion in 2050 (Holden B A, Fricke T R, Wilson D A et al.: Global Prevalence of Myopia and High Myopia and Temporal Trends from 2000 through 2050. Ophthalmol. 2016, 123: 1036-1042). Furthermore, there is an increasing trend for juveniles to develop high myopia (defined as SER ≤−5.00 D where SER stands for Spherical Equivalent Refraction), which substantially increases risk of eye diseases like cataract, glaucoma, retinal detachment, and myopic maculopathy, all of which can cause irreversible vision loss (Wong T Y, Ferreira A, Hughes R, et al.: Epidemiology and disease burden of pathologic myopia and myopic choroidal neovascularization: an evidence-based systematic review. Am. J. Ophthalmol. 2014; 157: 9-25). Epidemiological models predict a global increase in the number of people with high myopia from around 300 million in 2010 to 1 billion in 2050 (Holden et al. 2016). This will inevitably lead to a very high cost to society in treating visual impairment and lost productivity.

There are different approaches to slowing down or stopping progression of myopia. In one approach, progressive addition lenses are used for reducing the work necessary for accommodating the eye and, thus, the stimulus of eye growth. Another approach is based on spectacle lenses with lenslets or annular structures being present outside the area of the spectacle lens that is used for central vision. The lenslets or annular structures provide a power which leads to a peripheral myopic defocus outside the field of central vision. This manipulates peripheral vision such that the stimulus of eye growth is reduced. Spectacle lenses with microstructures or lenslets or annular structures are, for example, disclosed in the following documents: CN 111796364 A, CN 104678572 A, EP 3 553 594 A1, EP 3 561 578 A1, US 2016/0054588 A1, US 2017/0131567 A1, US 2017/027691 A1, U.S. Pat. No. 10,571,717 B2, WO 2018/026697 A1, WO 2018/076057 A1, WO 2019/166657 A1, WO 2020/113212 A1, and WO 2021/059887 A1. In particular, combining progressive addition lenses with lenslets leads to a promising approach to slowing down or stopping the progression of myopia.

The lenslets of the spectacle lenses may, for example, be produced by casting or molding processes as they are, for example, disclosed in U.S. Pat. No. 10,571,717 B2, EP 3 561 578 A1, EP 3 640 713 A1, EP 3 640 714 A1, and WO 2019/166657 A1. However, while molding is only manageable with thermoplastic materials and, therefore, imposes restrictions on the materials available for spectacle lenses with lenslets, casting with curable plastics is very difficult due to the exothermic curing process and the shrinking which comes along with the curing, and, in addition, casting is rather expensive. Moreover, molding or casting spectacle lenses with lenslets is difficult when using prefabricated semi-finished lens blanks for manufacturing the spectacle lenses because it is difficult to mold or cast the lenslets onto such lens blanks. Molding or casting the lenslets already in the semi-finished lens blanks does not help because the location of the zones with the lenslets can then not be optimized anymore for the finished spectacle lens.

US 2021/0001578 A1 describes a light modifier comprised of printed optical elements which is used for vehicle lights. The optical elements are printed layer by layer on a translucent substrate where each layer is cured before the next layer is printed. However, the printing method described in US 2021/0001578 A1 is not suitable for printing lenslets or the like on a surface of a spectacle lens that is intended to slow down or to stop progression of myopia as the lenslets or the like that need to be printed on the surface of such a spectacle lens are too small for printing them layer by layer.

Methods of providing lenslets without using molding or casting processes are disclosed in CN 111796364 A, EP 3 553 594 A1, WO 2018/026697 A1 and WO 2018/076057 A1. In particular, CN 111796364 A discloses producing lenslets by use of foils while EP 3 553 594 A1 WO 2018/026697 A1 and WO 2018/076057 A1 disclose manufacturing lenslets by means of additive manufacturing, like inkjet printing. In particular, WO 2018/026697 A1 discloses a printing process in which drops of an uncured printing material are jetted onto the surface of a spectacle lens using commercially available inkjet printers. Upon contact with the lens surface, the drops wet the surface forming uncured protuberances. The final lenslets are formed by curing the protuberances using ultraviolet light. However, such printed lenslets typically have very high powers of about 100 dpt or more, which is by an order of magnitude higher than what is desired for lenslets of spectacle lenses to be used for slowing down or stopping progression of myopia. It is therefore very difficult to print lenslets with adequate power using standard additive manufacturing equipment.

WO 2021/214197 A1, WO 2021/209527 A1, and US 2021/0354409 A1 disclose spectacle lenses including refractive microstructures in form of lenslets that are at least partly merged with a layer present on the surface. The line is disclosed in WO 2021/214197 A1 and WO 2021/209527 A1 are progressive spectacle lenses.

SUMMARY

It is a first objective of the present disclosure to provide a method of providing refractive microstructures on a surface of the spectacle lens, which allows for achieving an appropriate power of the refractive microstructures while using standard additive manufacturing equipment, i.e., commercially available printers.

It is a second objective of the present disclosure to provide a spectacle lens design with refractive microstructures of an appropriate power in a layer present on the surface, which can be manufactured with standard additive manufacturing equipment and which layer allows for increasing the adhesion and/or long-term stability of subsequent layers.

The first objective is accomplished by a method of providing refractive microstructures on the surface of a spectacle lens as claimed in claim 1. The second objective is accomplished by a spectacle lens design as claimed in claim 16. The dependent claims define further developments of the disclosure.

Spectacle Lens Body

In the context of the present disclosure, the term "spectacle lens body" refers to a spectacle lens serving as a substrate for forming refractive microstructures thereon. The spectacle lens body may be a spectacle lens manufactured to provide vision correcting properties according to a prescription. The spectacle lens body may be a standard spectacle lens produced in mass manufacturing and providing a standardized correction or it may be an individualized spectacle lens produced for an individual wearer to provide individualized correction according to the wearer's prescription which may in particular, be the case if the spectacle lens is a progressive addition lens (PAL). As an alternative, the spectacle lens body may be a spectacle lens of virtual reality (VR) glasses or augmented reality (AR) glasses with or without providing correction. Moreover, the spectacle lens body may be a semi-finished lens blank, i.e., a lens blank in which one of the surfaces is already polished to its final shape, while the other surface is to be machined and polished to achieve vision correcting properties according to a prescription. In case of the spectacle lens body being a semi-finished lens blank, the refractive microstructures will be applied onto the already finished surface.

Additive Manufacturing Process

In the context of the present disclosure, the term "additive manufacturing process" refers to a process of forming a three-dimensional object by depositing material onto a substrate according to a digital 3D model. The three-dimensional object is typically formed by depositing the material layer by layer until the three-dimensional object is finished. In the context of the present disclosure additive manufacturing processes are 3D printing processes using a curable ink material, i.e., solidifying or cross-linking ink material.

Nozzle Arrangement

As used throughout the present specification, a nozzle arrangement includes at least one nozzle for jetting a curable material towards a surface. Typically, the nozzle arrangement is part of a print head and includes a one-dimensional array of nozzles, i.e., a line of nozzles, or a two-dimensional array of nozzles. A two-dimensional array of nozzles may include at least two lines of nozzles. The lines of nozzles may be aligned with each other, or neighboring lines of nozzles may be shifted against each other in the direction in which the lines extend by a fraction of the distance between neighboring nozzles in a line so that a staggered arrangement of the lines of nozzles is realized.

Layer

In the context of the present disclosure, the term "layer" refers to a quantity of material covering a surface or extending between two surfaces. A layer may be structured, for example by including openings in the layer, as long as it covers a lateral area on the surface the dimensions of which are larger than the thickness of the material covering the surface by at least an order of magnitude and typically by at least two orders of magnitude.

Base Layer

In the context of the present disclosure, the term "base layer" refers to a layer applied onto a surface of a spectacle lens in a first pass of an additive manufacturing, e.g., in a first pass of a nozzle arrangement, to which, in a second pass of the additive manufacturing process, e.g., in a second pass of the nozzle arrangement, additional material is added at specific locations in order to form refractive microstructures.

Cover Layer

In the context of the present disclosure, the term "cover layer" refers to a layer covering refractive microstructures and, if applicable, a base layer.

Curable Material

In the context of the present disclosure, the term "curable material" refers to liquid or viscous monomeric or pre-polymeric material or formulation that can be solidified or which can undergo a process of polymerization and cross-linking to form a polymeric material. The polymerization and cross-linking reaction may, for example, be induced by ultraviolet radiation, heat, catalysts, etc.

Curing

In the context of the present disclosure, the term "curing" shall refer to solidifying, polymerizing, or cross-linking a curable material such as a monomeric or pre-polymeric formulation. The polymerization or cross-linking reaction may or may not require an initiator or catalyst to initiate the polymerization and cross-linking reaction. An initiator may be activated by an external stimulus such as electromagnetic radiation, particle beams, or heat.

Pinning

In the context of the present disclosure, the term "pinning" shall refer to a process which leads to a polymerization and/or cross-linking level that is less than it would be after full curing but nevertheless increases the viscosity of the polymer material so much that it prevents a considerable material flow over a time scale that is larger than the time scale necessary for finishing the desired structures, typically by at least a factor of two, more typically by at least a factor of 5. Reduced polymerization and/or cross-linking may, for example, be achieved by a reduced stimulus such as a reduced intensity of electromagnetic radiation or heat or by a reduced duration of the stimulus. Moreover, the term "pinning" shall also include situations in which a thin surface layer having a thickness of less than 3 μm, typically less than 1 μm, and even more typically less than 0.5 μm does not undergo cross-linking or not enough cross-linking to prevent a considerable material flow over a time scale that is larger than the time scale necessary for finishing the desired structures while layers below the surface layer, undergo enough cross-linking to prevent a considerable material flow over a time scale that is larger than the time scale necessary for finishing the desired structures. For example, some curable materials do not undergo cross-linking in the presence of oxygen. Due to oxygen inhibition a surface layer (also called oxygen inhibition layer) of such a material would not or not fully undergo polymerization while the bulk undergoes more polymerization until maximum achievable cure level is reached. With such curable materials, fully or partly removing the oxygen from the surrounding atmosphere or using a protective atmosphere such as an inert gas atmosphere like a nitrogen atmosphere, carbon dioxide atmosphere or a noble gas atmosphere would allow for fully cross-linking instead of pinning.

Droplet

In the context of the present disclosure, the term “droplet” refers to a volume of liquid below 200 pl dispensed by inkjet printing or a similar technique. For printing complex refractive microstructures smaller volumes would be advantageous, e.g., 50 pl or less.

Refractive Microstructure

In the context of the present disclosure, the term “refractive microstructure” refers to a structure providing a power in addition to the power provided by the spectacle lens body. The power may be a focal power so as to provide a point shaped or line shaped focus. A line shaped focus does not need to extend along a straight line but may also extend along the curved line such as a ring-shaped line. However, a refractive microstructure does not necessarily need to provide a point shaped or line shaped focus as long as it changes the curvature or direction of an incident wavefront more than the spectacle lens body does.

Rheological Properties

In the context of the present disclosure, the term “rheological properties” refers to the flow properties of a liquid.

Surface Energy

In the context of the present disclosure the term “surface energy” refers to the quantity of disruption of intermolecular bonds when a surface is created.

Surface Tension

In the context of the present disclosure, the term “surface tension” relates to the tendency of a liquid’s surface at rest to shrink in order to achieve a surface area as small as possible.

Convection/Convection Speed

In the context of the present disclosure, the term “convection” refers to a directed bulk flow of material that occurs within a fluid, e.g., due to temperature differences or driving forces. A driving force can, e.g., be a tendency of a surface of a liquid or viscous material to reduce surface tension by leveling out surface structures protruding over the surface. The “convection speed” is the speed of the flowing material.

Coalescing

In the context of the present disclosure, the term “coalescing” refers to a process in which protrusions from a surface of a liquid or viscous material are levelled out by material transport processes within the liquid or viscous material.

Diffusion

In the context of the present disclosure, the term “diffusion” refers to a gradient-driven movement of molecules or particles in a fluid which over time levels out the gradient, e.g., a gradient in concentration. A typical example is a random movement of molecules or particles, e.g., monomers or other kinds of molecules in a two-phase system of miscible fluids which over time levels out a gradient originally present in concentration of the two phases in the fluid.

Atmospheric Moisture

In the context of the present disclosure, the term “atmospheric moisture” refers to the content of water in the atmosphere.

Atmospheric Composition

In the context of the present disclosure, the term “atmospheric composition” refers to the relative amount of gases forming the atmosphere.

Surfactant

In the context of the present disclosure, the term “surfactant” refers to a substance that controls the surface tension of a liquid.

Protruding

In the context of the present disclosure, the term “protruding” refers to structures emerging from the surface.

Refractive Index

In the context of the present disclosure, the term “refractive index” of a material refers to the ratio of the propagation velocity of monochromatic radiation with a given wavelength in vacuum to the propagation velocity of said monochromatic radiation in the material (compare DIN ISO 13666:2019, section 3.1.5). The given wavelength may, for example, be 587.6 nm (Helium d-line). In the context of the present disclosure, two refractive indices shall be considered different refractive indices in case they differ from each other by at least 5 parts per thousand, typically at least 1 percent. On the other hand, two refractive indices shall be considered the same if they do not differ from each other by more than 5 parts per thousand typically not more than 1 part per thousand.

Power

In the context of the present disclosure, the term “power” refers to the capacity of a lens or an optical surface to change the curvature or direction of incident wavefronts by refraction (DIN ISO 13666:2019, section 3.1.10). The term “focal power” is a collective term for the spherical vertex power, which brings a paraxial pencil of parallel light to a single focus and which is usually considered in the prescription by the “sphere” value or, abbreviated, “sph,” and the cylindrical vertex power of a spectacle lens, which brings a paraxial pencil of parallel light to two separate line foci mutually at right angles (DIN ISO 13666:2019, section 3.10.2) and which is usually considered in the prescription by the “cylinder” value or, abbreviated, “cyl.” The “vertex power” is the reciprocal of the paraxial vertex focal length (DIN ISO 13666:2019, section 3.10.7). Within the scope of the present description, a beam is to be considered to be a paraxial pencil of rays if its diameter does not exceed 0.05 mm, in particular, 0.01 mm.

Myopic Defocus

In the context of the present disclosure, the term “myopic defocus” refers to a situation in which light focusses in front of the fovea by such a distance that a focused image on the fovea cannot be achieved, even when assisted by accommodation. A peripheral myopic defocus is a myopic defocus that is present outside the visual field outside the fovea.

Additional Power

In the context of the present disclosure, the term “additional power” applies to a power that is added to the focal power of a spectacle lens, where the focal power of a spectacle lens provides, assisted by accommodation, a focused image on the fovea and the additional power, when added to the focal power of a spectacle lens, provides for a myopic defocus. The additional power must not be confused with the addition power of a progressive addition lens.

Progressive Addition Lens

In the context of the present disclosure, the term “progressive addition lens” applies to power-variation lenses with two reference points for focal power, generally designed to provide correction for presbyopia and clear vision from distance to near (DIN ISO 13666:2019, section 3.7.8), where a power variation-lens is a spectacle lens with a smooth variation of focal power over part or all of its area, without discontinuity, designed to provide more than one focal power (DIN ISO 13666:2019, section 3.7.7).

Ring-Shaped

In the context of the present disclosure, a structure shall be considered as “ring-shaped” if there is a continuous path within the structure that encloses a structure-free zone or if the structure consists of sub-structures that are distributed along a path that encloses a structure-free zone.

Ring-Shaped Focusing Structures

In the context of the present specification, the term "ring-shaped focusing structures" applies to structures providing a ring-shaped focal line as well as to structures providing a plurality of (e.g., equidistantly arranged and typically mainly line-shaped or point-shaped) foci along a ring-shaped line. Such ring-shaped focusing structures may e.g., comprise structures similar to those described in EP 3 553 594 A1, EP 3 561 578 A1, WO 2019/166653 A1, WO 2019/166654 A1, WO 2019/166655 A1, WO 2019166657 A1, WO 2019/166659 A1 and WO 2019/206569 A1, respectively, or structures similar to those disclosed in US 2016/054588 A1, US 2017/227788 A1, US 2017/276961 A1, US 2019/227342 A1, WO 07/041796 A1, WO 09/129528 A1 or WO 10/129465 A1, respectively.

Spectacle Lens

In the context of the present disclosure, a "spectacle lens" is an ophthalmic lens worn in front of, but not in contact with, the eyeball (DIN ISO 13666:2019, section 3.5.2), where an ophthalmic lens is a lens intended to be used for purposes of measurement, correction and/or protection of the eye, or for changing its appearance (DIN ISO 13666:2019, section 3.5.1).

As-Worn Position

In the context of the present disclosure, the "as-worn position" is the position, including orientation, of the spectacle lenses relative to the eyes and the face during wear (DIN ISO 13666:2019, section 3.2.36). The as-worn position is determined by the as-worn pantoscopic angle, the as-worn face form angle and the vertex distance. The as-worn pantoscopic angle is the vertical angle between the horizontal and the perpendicular to a reference line passing through the apex of the grooves of the upper and lower rims of the frame in the vertical plane containing the primary direction (DIN ISO 13666:2019, section 3.2.37), where the primary direction is the direction of the line of sight, usually taken to be the horizontal, to an object at an infinite distance measured with habitual head and body posture when looking straight ahead in unaided vision (DIN ISO 13666:2019, section 3.2.25) and the line of sight is the ray path from the point of interest (i.e., point of fixation) in object space to the center of the entrance pupil of the eye and its continuation in image space from the center of the exit pupil to the retinal point of fixation (generally the foveola) (DIN ISO 13666:2019, section 3.2.24). Typical values of the as-worn pantoscopic angle lie in the range between −20 and +30 degree. The as-worn face form angle is the horizontal angle between the primary direction and the perpendicular to a reference line passing through the apex of the grooves of the nasal and temporal rims of the frame in the horizontal plane containing the primary direction (DIN ISO 13666:2019, section 3.2.38). Typical values of the as-worn face form angle lie in the range between −5 and +30 degree. The vertex distance is the horizontal distance between the back surface of the spectacle lens and the apex of the cornea, measured with the eyes in the primary position (DIN ISO 13666:2019, section 3.2.40), where the primary position is the position of the eye when looking in the primary direction (DIN ISO 13666:2019, section 3.2.26). Typical values of the vertex distance lie in the range between 5 mm and 30 mm. The as-worn position may be an individual as-worn position determined for a specific individual or a generic as-worn position determined for a defined group of wearers.

Spectacle Lens Design

In the context of the present disclosure, the term "optical spectacle lens design" is used to denominate the calculated/predetermined or defined optical properties of a spectacle lens, typically for a predetermined specific wearer, taking into consideration a position/arrangement of the spectacle lens relative to a model of an eye of the wearer of the spectacle lens, a position/arrangement of a model of an object to be viewed by the wearer of the spectacle lens for a specific use condition of the spectacle lens as well as a model of the physiological visual properties of the wearer of the spectacle lens.

Particularly, the optical spectacle lens design may comprise a distribution of optical power across an effective area of a spectacle lens as perceived by a predetermined wearer of the spectacle lens for a predetermined as-worn position relative to the wearer's (model) eye and a predetermined object distance model. The calculation of the distribution of the optical power is based on the distance and orientation of the spectacle lens relative to the model eye, the distance and orientation of the spectacle lens relative to the model object as well as physiological parameters of the spectacle wearer such as the wearer's visual deficiencies, namely, the wearer's ametropia, the wearer's ability to accommodate, and the wearer's pupillary distance.

The term "geometric spectacle" lens design means the geometry of the spectacle lens providing the calculated optical properties of a spectacle lens described in the foregoing for the spectacle wearer.

The term "target optical spectacle lens design" means a draft optical spectacle lens design, the optical properties of which correspond to or are equal to target optical properties. The term "actual optical spectacle lens design" means calculated optical properties of a spectacle lens being received as a result of an optimization process/calculation aiming to achieve the target optical spectacle lens design as close as possible. Such an optimization process/calculation in particular, for progressive spectacle lenses or customized single vision lenses is e.g., disclosed in Werner Kippen: Konzeption und Entwicklung von Progressivglasern, in Deutsche Optiker Zeitung DOZ 10/95, S. 42-46.

Such optical or geometric spectacle lens designs may be stored on a computer-readable (e.g., non-transitory and/or electronic and/or optical) data carrier. Moreover, spectacle lenses manufactured according to the spectacle lens design can be considered physical representations of the spectacle lens design.

Particular steps of an exemplary embodiment of a method for designing a spectacle lens are outlined in the following:

In a first step, individual user data or application data of the spectacle wearer are recorded. This includes the acquisition of (physiological) data that can be assigned to the spectacle wearer and the acquisition of usage conditions under which the spectacle wearer will wear the spectacles to be designed.

The physiological data of the spectacle wearer may include, e.g., the wearer's ametropia and the wearer's ability to accommodate, which are determined by means of a refraction measurement and which are regularly included in a prescription in the form of prescription values for sphere, cylinder, if applicable axis, prism, and base, as well as addition, if the spectacle lens is a progressive addition lens. Furthermore, e.g., the pupillary distance and the pupil size were determined under different lighting conditions. The convergence behavior of the eyes results from the pupillary distance for different viewing directions and object distances.

The conditions of use include the as-worn position of the spectacle lenses in front of the eye (usually in relation to the eye's pivot point) and the object distances for different viewing directions under which the spectacle wearer should see clearly. The seat of the spectacle lenses in front of the eye can, e.g., be determined by recording the corneal vertex distance as well as anterior and lateral inclination. These data are included in an object distance model, for which a ray tracing method can be applied.

In a subsequent step, a draft design for the spectacle lens with a large number of evaluation points is determined on the basis of this recorded data. The draft design includes target optical properties for the spectacle lens at the respective evaluation point. The target properties include, e.g., the permissible deviation from the prescribed spherical and astigmatic power, taking into account the addition, distributed over the entire spectacle lens, as specified by the arrangement of the lens in front of the eye and the underlying distance model.

Furthermore, a design of surface geometries for the front and back surfaces as well as a design for a refractive index distribution over the entire spectacle lens are specified. E.g., the front surface can be selected as a spherical surface and the back surface as a varifocal surface. Both surfaces could also initially be selected as spherical surfaces. The choice of surface geometry for the first draft generally only determines the convergence (speed and success) of the optimization method used. It should be assumed, for example, that the front surface is to retain the spherical shape and the back surface is given the shape of a varifocal surface.

In a further step, the course of main rays is determined through the large number of evaluation points. Possibly, a local wavefront can be established for each of the main rays in a vicinity of the respective main ray. According to Werner Köppen: Design and Development of Progressive Lenses, in Deutsche Optiker Zeitung DOZ 10/95, pp. 42-46, the number of evaluation points is usually in the range between 1000 and 1500. EP 2 115 527 B1 suggests a number of over 8000 evaluation points. Although the refractive index is usually dependent on the wavelength, the dispersion is generally not taken into account and the calculation is carried out for a so-called design wavelength. However, it cannot be ruled out that an optimization process takes different design wavelengths into account, as described in EP 2 383 603 B1, for example.

In a subsequent step, the above optical properties of the spectacle lens at the evaluation points are determined by evaluating the influence of the spectacle lens on the beam path of the main rays and, if necessary, the local wavefronts in the vicinity of the respective evaluation point.

In a further step, the design of the spectacle lens is evaluated depending on the determined optical properties and the individual user data. The back surface geometry and, as the case may be, the refractive index distribution of the design of the spectacle lens may be modified by minimizing a target function such as e.g.

$$F = \sum_m P_m \sum_n W_n (T_n - A_n)^2$$

where $P_m$ represents the weighting at the evaluation point m, $W_n$ the weighting of the optical property n, $T_n$ the target value of the optical property n at the respective evaluation point m and $A_n$ denotes the actual value of the optical property n at the evaluation point m.

In other words, the local surface geometry of the back surface and as the case may be the local refractive index of the spectacle lens in the respective visual beam path are modified by the evaluation points until a termination criterion is met.

Representation of a Spectacle Lens Design

In the context of the present disclosure, the expression "representation of a spectacle lens design" refers to an implementation of a spectacle lens having the respective design features (physical representation of the spectacle lens design) or to a numerical data set describing the design features (numerical representation of the spectacle lens design). For example, such a data set may be stored in a memory of a computer or on a computer-readable (particularly non-transitory) storage medium. In addition, the data set may be retrievable from a data network like, for example, the internet or a local area network (LAN). A data set resembling a representation of a progressive spectacle lens design may include, in particular, a description of the geometric shape and the medium of the progressive spectacle lens. Such a description can, e.g., include a mathematical description of the front surface, the rear surface, the arrangement of these surfaces in relation to one another (including the thickness) and the edge delimitation of the progressive spectacle lens as well as the refractive index distribution of the medium of which the spectacle lens is to be made. The representation can be in coded or even in encrypted form. The term medium here means the material(s) or the substance the spectacle lens is made of.

According to a first aspect of the present disclosure, a method of providing refractive microstructures on a surface of a spectacle lens body is provided in which the refractive microstructures are formed on the surface by an additive manufacturing process in which the refractive microstructures are formed by applying at least one curable material and curing the at least one curable material. The refractive microstructures may be implemented as lenslets, as ring-shaped focusing structures, as structures with a refractive index distribution, or any other structure that provides a power in addition to the power provided by the spectacle lens body. Moreover, the surface of the spectacle lens body may be a surface of a progressive addition lens.

According to the disclosure, the additive manufacturing process includes forming a layer of the at least one first liquid or viscous curable material where for forming the refractive microstructures an additional amount of the at least one first curable material or an amount of at least one second liquid or viscous curable material is applied at locations at which the refractive microstructures shall be formed before curing or pinning the at least one first curable material. In addition, the additive manufacturing process includes curing or pinning the layer of the at least one first curable material with the additional amount of the at least one first curable material or with the amount of the at least one second curable material before protrusions formed by the additional amount of the at least one first curable material or the amount of the at least one second curable material are levelled out by material transport processes within the liquid or viscous material in the layer of the at least one curable material.

In case the additive manufacturing process is a printing process, the amount of the at least one first curable material or the amount of the at least one second curable material that is applied to a location of the surface can be set by a number of droplets of curable material that are applied to said location.

Due to the fact that the additional amount of the at least one first curable material or the amount of the at least one second curable material is applied before curing or pinning the at least one first curable material, protrusions from the surface, which have at least in one direction an approximately spherical curvature, and/or concentration gradients develop at the locations at which the refractive microstructures shall be formed. Immediately after applying the additional amount of the at least one first curable material or the amount of the at least one second curable material, these protrusions and/or these concentration gradients start(s) to coalesce after the additional amount of the at least one first curable material or the amount of the at least one second curable material has been applied. Over time, this coalescing leads to a leveling of the layer surface at the locations at which the additional amount of the at least one first curable material or the amount of the at least one second curable material has been applied and, hence to a flattening of the approximately spherical curvature, and/or to a reduction of the concentration gradients at the locations at which the additional amount of the at least one first curable material or the amount of the at least one second curable material has been applied. Flattening the approximately spherical curvature, i.e., increasing the radius of curvature, and/or reducing the concentration gradients, in turn allows for using the curing or pinning such that, after the curing or pinning, a desired degree of curvature and/or a desired concentration gradient can be achieved. The resulting curvatures and/or concentration gradients then form microstructures with a desired refractive power. The coalescing of the additional amount of the at least one first curable material or the amount of the at least one second curable material reduces the curvature and/or the concentration gradients and, as a consequence, the refractive power provided at the locations where the refractive microstructures shall be formed. Hence, a desired refractive power can be achieved by stopping the coalescing at the right point in time by means of the curing or pinning process.

Moreover, in case at least one second curable material is used, the use of the at least one second curable material allows for influencing the coalescing speed by means of choosing suitable material combinations for the at least one first curable material and the at least one second curable material. In addition, the refractive index of the at least one first curable material may differ from the refractive index of the at least one second curable material. In this context, different refractive indices shall be refractive indices differing from each other by at least 5 parts per thousand, typically at least 1 percent. In case of miscible first and second curable materials, this allows for the refractive power of the refractive microstructures being based on index gradients instead of, or in addition to, the surface geometry of the layer applied to the surface of the spectacle lens body. For basing the refractive power of the refractive microstructures on index gradients it is typical that the refractive index of the at least one first curable material is smaller than the refractive index of the at least one second curable material. In particular, the refractive index of the at least one first curable material may be at least 5 parts per thousand smaller, typically at least 1 percent smaller, than the refractive index of the at least one second curable material. With basing the refractive power at least partly on a refractive index gradient, a positive refractive power can be achieved with refractive microstructures that protrude less from the surface than they would if their refractive power was solely based on their geometry, which allows for relatively flat topographies of the resulting surface. If the refractive index of the at least one second curable material is considerably higher than the refractive index of the at least one first curable material, it even becomes possible to have a positive refractive power with dents in the layer surface at the locations of the refractive microstructures. The formation of flat topographies or dents may for example be facilitated by applying to locations of the surface of the spectacle lens body where the refractive microstructures shall be formed an amount of the at least one first curable material that is less than an amount of the at least one first curable material applied to other locations and applying the amount of the at least one second curable material, typically exclusively, to the locations where the refractive microstructures shall be formed. In case of non-miscible first and second curable materials the second material would partly immerse in the first curable material leading to bi-convex structures. When choosing first and second curable materials having suitable properties including, for example, surface tension and density, this effect could be used to form bi-convex lenslets having a desired surface shape.

When the refractive power of the refractive microstructures is at least partly based on the difference in the refractive indices of the at least one first curable material and the second curable material, the refractive power of the refractive microstructures may be at least partly determined by the degree by which the at least one first curable material and the at least one second curable material are interdiffused until the layer of the at least one first curable material with the amount of the at least one second curable material is cured or pinned.

On the other hand, in case the refractive power shall be exclusively based on the surface geometry, either an additional amount of the at least one first curable material may be applied at locations at which the refractive microstructures shall be formed or the at least one first curable material and the at least one second curable material may have the same refractive index. In this context, two refractive indices shall be considered to be the same if they do not differ from each other by more than 5 parts per thousand, typically not more than 1 part per thousand. In this case, the power provided by the refractive microstructures is not influenced by diffusion of the at least one second curable material into the at least one first curable material so that the power of the refractive microstructures is mainly determined by their surface geometry.

In the inventive method of providing refractive microstructures on a surface of the spectacle lens body, the layer of the at least one first curable material with the additional amount of the at least one first curable material or with the amount of the at least one second curable material may be formed in a single step, for example, in a single pass of the nozzle arrangement in the case of inkjet printing. This may, e.g., be realized by varying the number of droplets of curable material applied to different locations of the surface. As an alternative, the layer of the at least one first curable material with the additional amount of the at least one first curable material or with the amount of the at least one second curable material may be formed in a multi-step process. For example, in a first step of the additive manufacturing process, like in a first pass of the nozzle arrangement, a continuous base layer may be applied to the surface of the spectacle lens body by use of the at least one first curable material. Then, in a second step of the additive manufacturing process, like in a second pass of the nozzle arrangement, the additional amount of the at least one first curable material or the amount of the at least one second curable material is applied to the base layer at the locations where the refractive microstructures shall be formed while the at least one first curable material of the base layer is not yet cured or pinned. The base layer applied in the first step does not necessarily need to have a uniform thickness. In particular, the base layer may be thinner at locations at which the refractive microstructures shall be formed than at other locations. In both variants the geometry of the refractive microstructures can be determined by varying the number of droplets applied to different locations. This allows for giving the refractive microstructures any desired shape. For example, the distribution of droplets of curable material that are applied may be chosen such that the droplets merge into sphere-shaped or ring-shaped refractive microstructures.

For suitably setting the power provided by the refractive microstructures at least one of the following parameters may be used:

- The time after which the curing or pinning is started.
- The time given for the at least one first curable material or the time given for the at least one first curable and the at least one second curable material to cure or be pinned after the curing or pinning is started.
- The additional amount of the at least one first curable material or the amount of the at least one second curable material applied at the locations where the refractive microstructures shall be formed.
- The rheological properties of the at least one first curable material or the rheological properties of the at least one first curable and the at least one second curable material.
- The combination of surface energies of the at least one first curable material and the material of the spectacle lens body or the combination of surface energies of the at least one first curable material and the at least one second curable material and the material of the spectacle lens body.
- The combination of surface tensions of the at least one first curable material and the at least one second curable material.
- The convection speed of the at least one first curable material or the convection speed of the at least one first curable and the second curable material.
- Temperature differences during the additive manufacturing process.
- The temperature of a nozzle arrangement during the additive manufacturing process.
- The temperature of the spectacle lens body during the additive manufacturing process.
- The atmospheric temperature during the additive manufacturing process.
- The atmospheric moisture during the additive manufacturing process.
- The atmospheric composition during the additive manufacturing process.
- The strength of external electric or magnetic fields present during the additive manufacturing process.
- The density of the at least one first curable material or the densities of the at least one first curable material and the at least one second curable material.
- The chemical composition of the at least one first curable material or the chemical compositions of the at least one first curable material and the at least one second curable material.

Some formulations of curable materials involve initiators to start the polymerization reaction. Moreover, there are formulations of curable materials with an initiator that needs stimulation to be activated so as to induce the curing or pinning reaction. Such activation may be provided by heat, particle beams, or electromagnetic radiation, e.g., ultraviolet radiation. Therefore, whether or not an initiator is present and how much initiator is present in the chemical composition of the formulation of the curable material influences, for example, the speed at which the polymerization and/or cross-linking proceeds and how quickly the polymerization and/or cross-linking starts after stimulating the initiator, e.g., by irradiating it with ultraviolet radiation.

A surfactant may be added to at least one of the at least one first curable material and the at least one second curable material in order to control the surface tension and the flow behavior of at least one of the materials.

All of the parameters mentioned above influence the coalescing of the additional amount of the at least one first curable material and/or the coalescing and forming of the amount of the at least one second curable material and/or the diffusion of the amount of the at least one second curable material and, hence, the final topography and/or material distribution at the location of the refractive microstructures. The topography and/or, in case of the at least one first curable material and the at least one second curable material having different refractive indices, the material distribution determine the power of the refractive microstructures. Thus, the inventive method provides a wealth of parameters for setting the power of the refractive microstructures.

In the inventive method, the additive manufacturing process may include a step of applying a cover layer onto the layer of the at least one first curable material with the additional amount of the at least one first curable material or with the amount of the at least one second curable material. The cover layer may, for example, be applied by inkjet printing or by coating techniques such as spin-coating. Also, a lamination process of a foil with an adhesive with or without the help of a bonding layer can be used. Moreover, the cover layer may be applied after curing or pinning the layer of the at least one first curable material with the additional amount of the at least one first curable material or with the amount of the at least one second curable material to avoid undesired influences of the application process for applying the cover layer on the layer of the at least one first curable material with the additional amount of the at least one first curable material or with the amount of the at least one second curable material.

A thick enough cover layer allows for a surface following the surface of the spectacle lens body without the microstructures protruding from the surface of the finished spectacle lens. In addition, protective layers or other functional layers may be applied as cover layers or onto the cover layer, which increases usability of the spectacle lenses. Moreover, the power of the refractive microstructures may be at least partly determined by the ratio of the refractive index of the cover layer material to the refractive index of the at least one first curable material or to the at least one second curable material. Hence, choosing the refractive index of the cover layer material in view of the refractive index of the at least one first curable material or the at least one second curable material provides for a further parameter for determining the power of the refractive microstructures. The refractive index of the cover layer material is typically smaller than the refractive index of the at least one first curable material or the at least one second curable material so that a positive power can be provided by the refractive microstructures. In particular, the refractive index of the cover layer material may be at least 5 parts per thousand smaller, typically at least 1 percent smaller, than the refractive index of the at least one first curable material or the at least one second curable material. However, in principle it is also possible that the cover layer material has a refractive index that is larger than the refractive index of the at least one first curable material or the at least one second curable material. In particular, the refractive index of the cover layer material may be at least 5 parts per thousand larger, typically at least 1 percent larger, than the refractive index of the at least one first curable material or the at least one second curable material. In this case the refractive microstructures could provide a positive power even if they have a concave curvature.

In the inventive method, the at least one first curable material may have the same refractive index as the material of the spectacle lens body which prevents from a refractive interface forming between the spectacle lens body and the layer into which the refractive microstructures are embedded. However, the refractive index of at least one of the first curable material and the at least one second curable may as well be larger than the refractive index of the material of the spectacle lens body. In particular, the refractive index of at least one of the first curable material and the at least one second curable may be at least 5 parts per thousand larger, typically at least 1 percent larger, than the refractive index of the material of the spectacle lens body.

According to a second aspect of the disclosure, a spectacle lens with refractive microstructures is provided. The spectacle lens includes a spectacle lens body with a surface which is provided with the refractive microstructures. The refractive microstructures are at least partly merged with a layer present on the surface and at least partly or even fully have refractive properties due to a gradient in the refractive index that is present in the refractive microstructures.

In the inventive spectacle lens, the spectacle lens body may be a spectacle lens body of a progressive addition lens. Combining refractive microstructures with a progressive addition lens is particularly effective in slowing down or stopping the progression of myopia. Merging the refractive microstructures at least partly with a layer present on the surface of the spectacle lens body allows for manufacturing a spectacle lens with the inventive method. Hence, the inventive spectacle lens allows for producing progressive addition lenses having microstructures using a standard additive manufacturing process, e.g., inkjet printing.

In case the refractive microstructures are covered by a cover layer, a flat surface following the surface of the lens body can be achieved. The refractive index of the cover layer may be smaller than the refractive index of the refractive microstructures. In particular, the refractive index of the cover layer may be at least 5 parts per thousand smaller, typically at least 1 percent smaller, than the refractive index of the refractive microstructures. This helps to assure that refractive microstructures with a convex curvature provide a positive power. However, in principle it is also possible that the refractive index of the cover layer is larger than the refractive index of the refractive microstructures. In particular, the refractive index of the cover layer may be at least 5 parts per thousand larger, typically at least 1 percent larger, than the refractive index of the refractive microstructures. In this case the refractive microstructures could provide a positive power even if they have a concave curvature. Hence, the cover layer allows for a wider variation in the possible geometric shapes of the refractive microstructures. In particular, in a system of refractive microstructures and a cover layer a refractive index of the cover layer is larger than the refractive index of the refractive microstructures reduces the refractive power that is provided to the geometry of the refractive microstructures and, thus, allows for refractive microstructures with smaller radii of curvature. Moreover, choosing a suitable refractive index of the cover layer allows for fine tuning the refractive power provided by the system of the refractive microstructures and the cover layer.

According to a still further aspect of the disclosure, a data set is provided which comprises at least one kind of the following kinds of data: (i) a numerical representation of the inventive spectacle lens for the purpose of a use of the numerical representation of the spectacle lens for a manufacture of the inventive spectacle lens, and (ii) data containing computer-readable instructions for controlling one or more manufacturing machines in order to produce an inventive spectacle lens. The data set allows for sending the data to a manufacturer of spectacle lenses. The purpose of a use of the numerical representation of the spectacle lens for a manufacture of the inventive spectacle lens may include the purpose of generating data containing computer-readable instructions for controlling one or more manufacturing machines in order to produce a spectacle lens.

BRIEF DESCRIPTION OF THE DRAWINGS

Further features, properties and advantages of the present disclosure will become clear from the following description in conjunction with the accompanying drawings.

DESCRIPTION OF EXEMPLARY EMBODIMENTS

A first exemplary embodiment of the inventive method of providing refractive microstructures on a surface of spectacle lens body 3 will now be described with respect to FIGS. 1 to 4. In this exemplary embodiment the power of the refractive microstructures is determined by the curvature of their surface.

Figure 1:
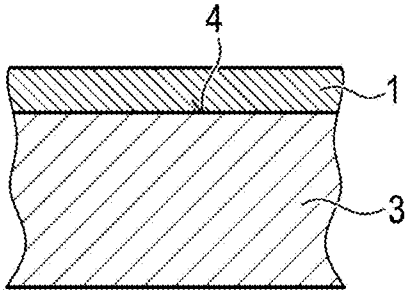
FIGS. 1 to 4 schematically show steps of the first exemplary embodiment of the inventive method of providing refractive microstructures.

As shown in FIG. 1, according to the first exemplary embodiment of the inventive method, a base layer 1 of a first curable material is applied to a surface 4 of a spectacle lens body 3 by means of an additive manufacturing process, which will be called 3D printing in the following. In such 3D printing processes 3D structures are formed by printing the structures onto a substrate by use of a polymer ink.

The 3D printing is done by means of a nozzle arrangement 8 the nozzles of which jet the curable material towards the surface 4 of a spectacle lens body 3 while the nozzle arrangement 8 and the spectacle lens body 4 move relative to each other. In the present exemplary embodiment, the nozzle arrangement 8 is part of a single print head which includes a one-dimensional array of nozzles, i.e., a line of nozzles, extending perpendicular to the direction of the relative movement between the nozzle arrangement 8 and the spectacle lens body 4. However, the print head could as well include a two-dimensional array of nozzles, e.g., two or more lines of nozzles. The lines of nozzles of the two-dimensional array may be aligned with each other in the direction of the relative movement between the nozzle arrangement 8 and the spectacle lens body 4. As an alternative, neighboring lines of nozzles may be shifted against each other in the direction perpendicular to the direction of the relative movement between the nozzle arrangement 8 and the spectacle lens body 4 by a fraction of the distance between neighboring nozzles in a line of nozzles so that a staggered arrangement of the lines nozzles is realized. By such a staggered arrangement, the resolution that is achievable in the printing process can be increased.

The polymer ink, i.e., the first curable material 6, of the present exemplary embodiment cures by polymerization of monomers and/or oligomers and by cross-linking polymer chains in the ink material. The polymerization and cross-linking is initiated by an initiator that is activated by an external stimulus which is ultraviolet (UV) radiation in the present exemplary embodiment. In other exemplary embodiments, the initiator may be activated by other means, e.g., heat or a particle beam, or an initiator is not used at all.

Suitable 3D polymer inks for use as first curable material 6 in the present exemplary embodiment are (meth)acrylate-based polymer inks typically without solvents. However, polymer inks with a small fraction of a solvent may also be used in cases where the base layer thickness is small enough such that the solvent can evaporate before the curing process. Typical materials of the spectacle lens body 3 are thermoplastics such as polycarbonate or thermosets such as CR-39. A compilation of polymers that are suitable for forming the spectacle lens body 3 is given in Table 1.

TABLE 1

Compilation of polymers suitable for forming the spectacle lens body 3

| Trade name | Resin | Average refractive index $n_D$* | Abbe number $v_D$* |
|---|---|---|---|
| CR-39, CR-330, CR-607, CR-630, RAV 700, RAV 7NG, RAV 7AT, RAV 710, RAV 713, RAV 720 | Poly allyl diglycol carbonate (PADC) | 1.500 | 56 |
| RAVolution | Polyurea/Polyurethane | 1.500 | 54 |
| Trivex | Polyurea/Polyurethane | 1.530 | 45 |
| Panlite, Lexan, Makrolon | Polycarbonate (PC) | 1.590 | 29 |
| MR-6 | Polythiourethane | 1.598 | |
| MR-8 | Polythiourethane | 1.598 | 41 |
| MR-7 | Polythiourethane | 1.664 | 32 |
| MR-10 | Polythiourethane | 1.666 | 32 |
| MR-174 | Polyepisulfide | 1.738 | 32 |
| MGC 1.76 | Polyepisulfide | 1.76 | 30 |
| Spectralite | Urethane/(Meth)acrylate | 1.54 | |

The polymer ink used as first curable material 6 forming the base layer 1 may have a refractive index that is the same as the refractive index of the material of the spectacle lens body 3. In the context of the present disclosure, refractive indices shall be considered the same if they differ from each other by not more than 5 parts per thousand, typically not more than one part per thousand. However, the first curable material 6 and the material of the spectacle lens body 3 do not need to have the same refractive index. In particular, the refractive index of the first curable material 6 may be lower than the refractive index of the material of the spectacle lens body which can be beneficial for the design of an additional anti-reflection (AR) coating. Furthermore, the first curable material 6 should also be suitable as substrate for hard coatings applied later onto the base layer 1 and refractive microstructures present in the base layer 1. In addition, the first curable material 6 must provide sufficient optical quality once it is cured. In the context of the present disclosure, a sufficient optical quality is achieved if the yellowness index (YI) of the spectacle lens with the refractive microstructures is below 3, typically below 1, and more typically below 0.5 and the haze is below 1.0% and typically below 0.5%.

A typical thickness of the base layer 1 lies in the range between 1 and 100 μm, typically in the range between 5 and 50 μm. In order to prevent from the formation of unwanted structures in a thin base layer, i.e., a base layer with a thickness below 20 μm, random noise can be added to the pattern by which the nozzles of the nozzle arrangement 8 jet the droplets so that the droplets which shall form the base layer 1 are not printed in a regular pattern. Such an approach is called dithering. In the present exemplary embodiment, the thickness of the base layer 1 lies in the range between 15 and 50 μm and may, in particular, be 45 μm.

Figure 2:
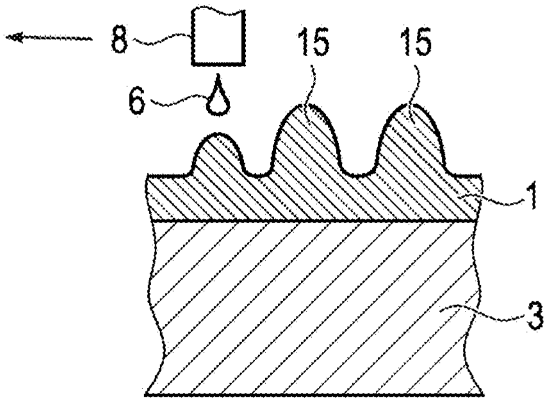

After the base layer 1 has been printed onto the surface 4 of the spectacle lens body 3 in a first pass of the print head 8, an additional amount of the first curable material 6 is applied to the still liquid base layer 1 at locations at which the refractive microstructures 5 shall be formed in a second pass of the print head 8 (the moving direction of the print head 8 is indicated by an arrow in FIG. 2). The additional amount of the first curable material 6 forms protrusions 15 from the surface of the base layer 1 which immediately after deposition start to merge with the base layer 1 due to coalescence. A short time after the droplets forming the protrusions 15 have been printed onto the base layer 1, the curvature of the protrusions 15 is high, i.e., the radius of curvature is small, and, thus, the refractive power provided by the protrusions 15 is high while, over a long time, the surface energy of the first curable material 6 causes the protrusions 15 to merge with the base layer 1. As a consequence, over a long time, the curvature of the protrusions 15 flattens, i.e., the radius of curvature increases, which reduces the power of the protrusions 15. The merging speed goes down with increasing viscosity during a pinning process or a curing process and finally stops when the material is cured. Therefore, controlling the time until the pinning or curing starts and the time given for pinning or curing the first curable material 6, i.e., the material of the base layer 1 and the protrusions 15, allows for determining the final curvature of the protrusions 15 and, thus, their refractive power. Moreover, further parameters can be used to control at least one of the merging speed and the speed of pinning or curing in the present exemplary embodiment. Those parameters include:

- The additional amount of the at least one first curable material 6 applied at the locations where the refractive microstructures shall be formed.
- The rheological properties of the at least one first curable material 6.
- The combination of surface energies of the at least one first curable material 6 and the material of the spectacle lens body.
- The convection speed of the at least one first curable material 6.
- Temperature differences during the additive manufacturing process.
- The temperature of a nozzle arrangement during the additive manufacturing process.
- The temperature of the spectacle lens body during the additive manufacturing process.
- The atmospheric temperature during the additive manufacturing process.
- The atmospheric moisture during the additive manufacturing process.
- The atmospheric composition during the additive manufacturing process.
- The strength of external electric or magnetic fields present during the additive manufacturing process.
- The density of the at least one first curable material 6.
- The chemical composition of the at least one first curable material 6.

Figure 3:
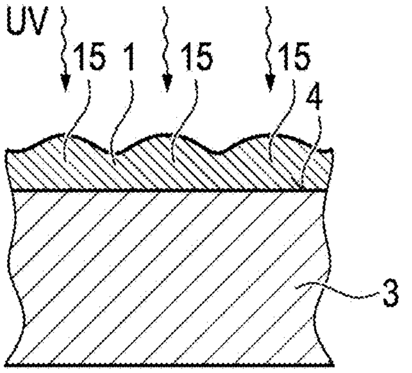

In other words, the controlled merging provides a process that allows for a controlled reduction of the curvature of the protrusions 15, i.e., that increases its radius of curvature. The reduction of curvature in turn reduces the power provided by the curvature of the protrusions 15. A state in which the refractive microstructures 5 are partially merged with the base layer 1 is shown in FIG. 3.

In the present exemplary embodiment, the merging of the protrusions 15 with the base layer 1 needs to be stopped before the protrusions 15 are fully merged with the base layer 1 in order to keep the curvature of the protrusions 15 at a level that provides the desired refractive power, which is not more than 10 dpt and typically lies between 1.5 and 5.5 dpt. The time after which the protrusions 15 are fully merged with the base layer 1 depends on numerous parameters including the temperature and the thickness of the base layer 1 and on the surface tensions involved, for example.

In order to stop the merging process, any material transport is brought to a halt or considerably slowed down by pinning in the present exemplary embodiment. In the present exemplary embodiment this means that the first curable material 6, i.e., the material of the protrusions 15 and of the base layer 1, becomes cured except for a surface layer in contact with an oxygen containing atmosphere which remains uncured. In other exemplary embodiments a protective atmosphere without oxygen may be used so that the surface layer undergoes polymerization, too, and the protrusions 15 as well as the base layer 1 will be fully cured instead of being pinned.

In the present exemplary embodiment, the pinning (or the full curing) is initiated with the help of an initiator, which is a photoinitiator in the present exemplary embodiment. To activate the photoinitiator in order to start the pinning (or curing), the protrusions 15 and the base layer 1 are irradiated with ultraviolet radiation, i.e., radiation with a wavelength in the range between 10 and 400 nm. In other exemplary embodiments the initiator may be activated by a stimulus other than ultraviolet radiation, for example by light in the spectral range of visible light, by infrared radiation, by heat or by a particle beam. Moreover, exemplary embodiments are conceivable that use polymers which undergo cross-linking without the need of an initiator.

Due to the pinning (or the curing), the merging of the protrusions 15 in the base layer 1 stops. The time between printing the protrusions 15 onto the base layer 1 and stopping the merging by the pinning (or curing) determines the final topography of the refractive microstructure 5 formed by the protrusions 15. The longer the refractive protrusions 15 have finally merged with the base layer 1, i.e., the wider the protrusions 15 have spread, the lower is their optical power.

After the pinning (or curing), the curvature of the protrusions 15 and, thus, the curvature of the refractive microstructures 5 should not depend on whether they were printed at the beginning of printing the protrusions 15 or at the end of printing the protrusions 15. If the time passing between printing the first protrusions 15 and the last protrusions 15 is short compared to the time the protrusions 15 need to fully merge with the base layer 1 all protrusions 15 can be treated such as if they would start to merge at the same time. As the number of droplets of the first curable material 6 needed for printing a protrusion 15 is relatively small, a single pass of the print head 8 is enough for printing all the protrusions 15. This means that the time that passes between printing the first protrusions 15 and the last protrusions 15 can be kept short which allows for treating the protrusions 15 such as if they would start to merge at the same time.

Figure 4:
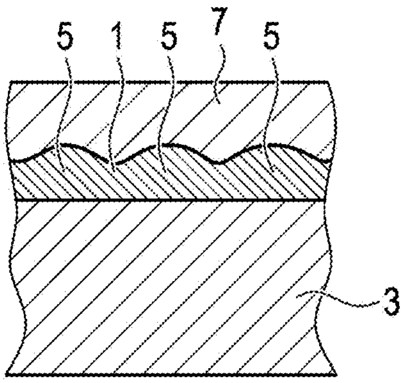

In the present exemplary embodiment, fully curing the pinned base layer 1 with the protrusions 15, i.e., fully cross-linking the pinned base layer 1 with the protrusions, is done at a later point in time, namely after a cover layer 7 has been applied onto the base layer 1 with the protrusions 15, as it is shown in FIG. 4. However, the pinned base layer 1 with the protrusions 15 could as well be fully cured before applying the cover layer 7. The fact that a surface film of the base layer 1 with the protrusions 15 is not fully cross-linked after the pinning, helps to improve bonding between the cover layer 7 to the base layer 1 with the protrusions 15. In the present exemplary embodiment, the cover layer 7 is printed onto the base layer 1 with the protrusions 15. However, it is also possible to apply the cover layer 7 by spin coating or by means of a bonded foil. After the cover layer 7 has been applied it protects the base layer 1 with the protrusions 15.

The thickness of the cover layer 7 is chosen such that the refractive microstructures 5 realized by the protrusions 15 after curing are fully covered by the cover layer 7. To achieve this goal, the thickness of the cover layer 7 typically lies in the range between 2 and 15 times the height by which the refractive microstructures 5 formed by the protrusions 15 protrude from the base layer 1, in particular, in the range between 5 and 10 times the height by which the refractive microstructures structures 5 project over the base layer 1.

Suitable materials for the cover layer 7 are (meth)acrylate-based materials. However, instead of (meth)acrylate-based materials, other curable or setting materials could be used for the cover layer 7 if they allow layer thicknesses in the range between 1 and 100 μm, in particular, in the range between 1 and 50 μm. Possible materials are epoxides, epoxy-thiol systems, thiolene-based systems, urethanes, polysiloxane-based systems, etc.

Without the cover layer 7, the power provided by the refractive microstructures 5 will not only depend on their curvature but also on the refractive index difference between the first curable material 6 and air. Hence, with first curable materials having refractive indices in the range between 1.50 and 1.74 the refractive index difference would approximately lie in the range between 0.5 and 0.74. With the cover layer 7 this refractive index difference would be reduced, which would allow for higher curvatures of the refractive microstructures 5. Hence, the refractive index of the cover layer 7 may be used for compensating too large curvatures of the refractive microstructures 5.

In the present exemplary embodiment, the viscosity of the base layer 1 may be altered in order to suitably set the merging speed of the refractive microstructures 5 in the base layer 1. The viscosity may, for example, be adjusted by adjusting the temperature of the printing environment and/or the temperature of the printing material, i.e., the first curable material 6. Moreover, viscosity may be altered by pinning the first curable material 6. The degree of pinning can, for example, be adjusted by the oxygen concentration of the atmosphere in which the additive manufacturing takes place during the pinning process, by the dose of UV-radiation used for the pinning, by the initiator content, etc.

Although the same first curable material 6 is used for forming the base layer 1 and the protrusions 15 in the first exemplary embodiment described so far, it is also possible to use at least one first curable material for printing the base layer 1 and at least one second curable material 16 that differs from the at least one first curable material 6 for printing the protrusions 15. The at least one first curable material and the at least one second curable material may either have the same refractive index or different refractive indices.

Figure 5:
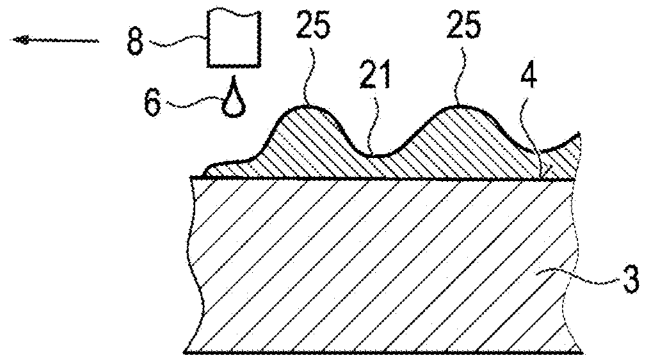
FIG. 5 schematically shows a second exemplary embodiment of the inventive method of providing refractive microstructures.

In the following, a second exemplary embodiment of the inventive method will be described with respect to FIG. 5. The method of the second exemplary embodiment differs from the method of the first exemplary embodiment in that a layer 21 of the first curable material 6 and the protrusions 25 are formed in a single pass of the nozzle arrangement represented by the print head 8. The moving direction of the print head 8 is indicated by an arrow in FIG. 5.

In the second exemplary embodiment, the printing nozzles of the print head 8 print different amounts of the first curable material 6 at different locations of the surface 4 of the spectacle lens body 3. At those locations of the surface 4 at which no refractive microstructures 5 shall be formed, the nozzles of the print head 8 eject a certain amount of the first curable material 6 for forming a layer 21 of the first curable material 6 while at locations at which the refractive microstructures 5 shall be formed the nozzles of the print head 8 eject a larger amount of the first curable material 6. The additional amount of the first curable material 6 that is applied to the surface 4 at the locations at which the refractive microstructures shall be formed as compared to other locations of the surface 4 leads to the formation of protrusions 25 protruding from the layer 21 of the first curable material 6. After the layer 21 with the protrusions 25 has been printed onto the surface 4 of the spectacle lens body 3 by a single pass of the print head 8, the remaining steps of the method of providing refractive microstructures 5 on the surface 4 of the spectacle lens body 3 are the same as in the first exemplary embodiment.

As in the first exemplary embodiment, the coalescing is stopped by pinning or at least partial curing using ultraviolet radiation as it has been described with respect to FIG. 3.

What has been said with respect to the nozzle arrangement and the materials used in the first exemplary embodiment applies to nozzle arrangement and the materials of the second exemplary embodiment, as well.

Figure 6:
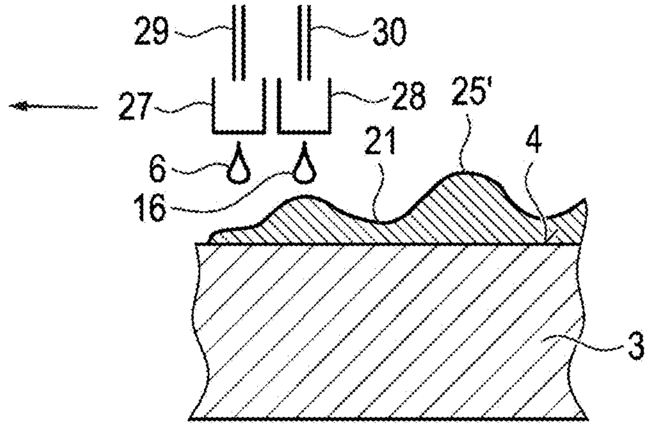
FIG. 6 schematically shows a third exemplary embodiment of the inventive method of providing refractive microstructures.

In the second exemplary embodiment a single print head 8 is used for printing the layer 21 and the protrusions 25 in a single pass of the print head 8. In a third exemplary embodiment of the inventive method, which is shown in FIG. 6, the nozzle arrangement is implemented as two print heads 27, 28. Each of the print heads 27, 28 may include a one-dimensional or two-dimensional array of nozzles and may have its own individual feed line 29, 30 for feeding curable material to its array of nozzles, as it is depicted in FIG. 6. However, instead of using two print heads 27, 28 it would also be possible to use a single print head with two or more arrays of nozzles.

In the third exemplary embodiment, the two print heads 27, 28 are used for printing a layer 21 of a first curable material 6 and protrusions 25' protruding from the layer 21 in a single pass of the print heads 27, 28 in FIG. 6. The direction of relative movement between the print heads 27, 28 and the spectacle lens body 3 is indicated by an arrow. During the passing over the surface 4 of the spectacle lens body 3, the first print head 27 ejects the first curable material 6 forming the layer 21 while the second print head 28 ejects the additional amount of the first curable material 6 forming the protrusions 25'. After the layer 21 of the first curable material 6 with the protrusions 25' has been printed onto the surface 4 of the spectacle lens body 3 by a single pass of the print heads 27, 28, the remaining steps of the method of providing refractive microstructures 5 on the surface 4 of the spectacle lens body 3 are the same as in the first exemplary embodiment.

If the two print heads 27, 28 of the third exemplary embodiment have different feed lines 29, 30 for feeding curable material, as it is shown in FIG. 6, it is also possible to print the layer 21 by ejecting a first curable material 6 using the first print head 27 and to print the protrusions 25' by ejecting an amount of a second curable material onto the first curable material 6 using the second print head 28. In case of using more than two print heads, for example three, four, five, or even more print heads, more sophisticated combinations of curable materials may be realized if each print head has its own feed line for feeding curable material. The same could be achieved with a single print head that includes two or more arrays of nozzles and individual feed lines for the arrays of nozzles.

Figure 7:
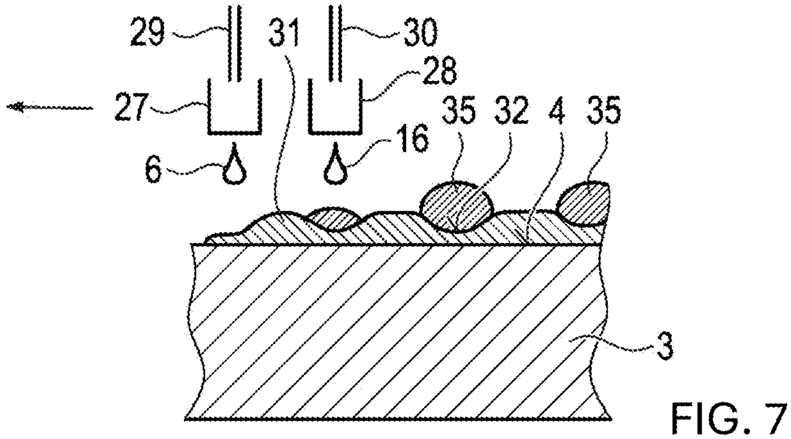
FIGS. 7 and 8 schematically show a fourth exemplary embodiment of the inventive method of providing refractive microstructures.
Figure 8:
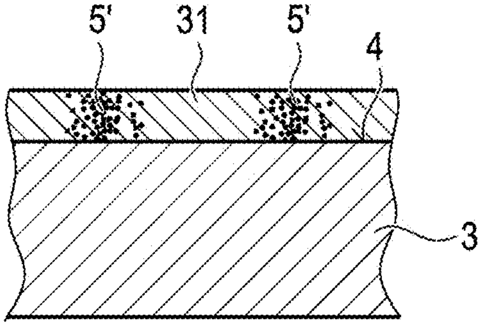

In the following, a fourth exemplary embodiment of the inventive method will be described with respect to FIGS. 7 and 8. Like in the second and third exemplary embodiments, a layer 31 and protrusions 35 are printed onto the surface 4 of the spectacle lens body 3 in a single printing pass using a nozzle arrangement that is implemented as two print heads 27, 28 with individual feed lines 29, 30. However, instead of being implemented as two print heads 27, 28, the nozzle arrangement could as well be implemented as a single print head that includes two or more arrays of nozzles and individual feed lines for the arrays of nozzles.

Like in the third exemplary embodiment, the direction of relative movement between the print heads 27, 28 and the spectacle lens body 3 is indicated by an arrow. The fourth exemplary embodiment differs from the second and third exemplary embodiments in the structure of the layer 31 of the first curable material 6 and in the way the refractive properties of the refractive microstructures 5' are achieved. For this purpose, a second curable material 16 with a refractive index that differs from the refractive index of the first curable material 6 by being higher than the refractive index of the first curable material 6 is used.

In the fourth exemplary embodiment the amount of the first curable material 6 that is applied to locations of the surface 4 of the spectacle lens body 3 where the refractive microstructures 5' shall be formed by using the first print head 27 is less than an amount of the first curable material 6 that is applied to other locations of the surface 4. As a consequence, the layer 31 is formed with dents 32 at those locations where the refractive microstructures 5' shall be formed. Although the dents 32 do not reach to the surface 4 of the spectacle lens body 3 in the present exemplary embodiment, there may be exemplary embodiments in which the surface 4 of the spectacle lens body 3 is exposed in the center of the dents 32. Whether or not the dimples 32 expose the surface 4 of the spectacle lens body 3, depends on the thickness of the layer 31 and the lateral dimensions of the dents 32 which, in turn, depend on the lateral dimensions of the refractive microstructures to be formed. For example, for the typical lateral dimensions of the refractive microstructures to be formed, the dents 32 might probably expose the surface 4 in case of layers 31 of the first curable material 6 with a maximum thickness up to 10 μm while they will most likely not expose the surface 4 in case of layers 31 of the first curable material 6 with larger thicknesses. Typical lateral dimensions of refractive microstructures to be formed are 0.1 to 2 mm.

Figure 9:
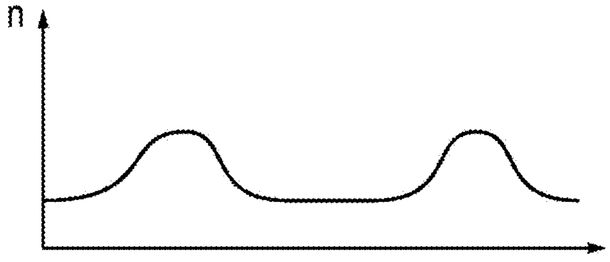
FIG. 9 shows the refractive index distribution in a layer of a first curable material and a second curable material with a refractive index that differs from the refractive index of the first curable material after curing or pinning the first curable material and the second curable material.
Figure 10:
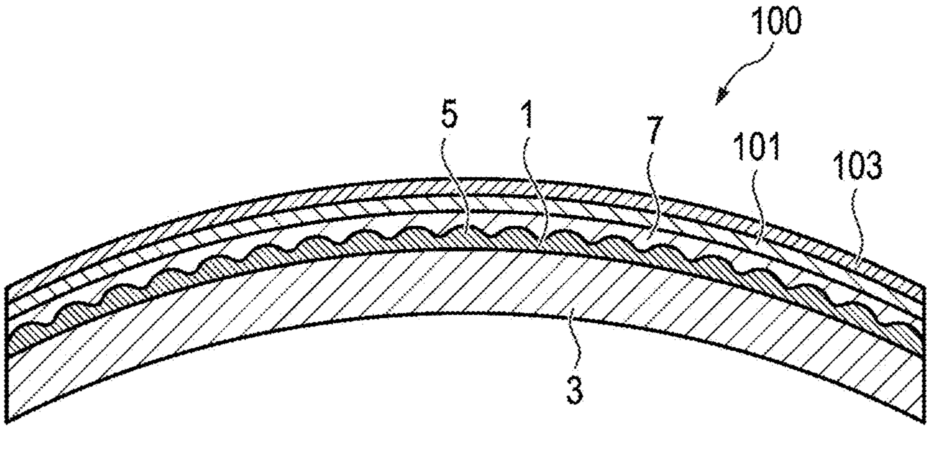
FIG. 10 shows a sectional view of an exemplary embodiment of a spectacle lens manufactured according to the inventive method.

Using the second print head 28, the second curable material 16 is printed into the dents 32. As a consequence, at least the lower part of the amount of second curable material 16 applied into the dents 32 is laterally surrounded by the layer 31 of the first curable material 6. Since both the first curable material 6 and the second curable material 16 are still liquid, the first curable material 6 and the second curable material 16, which has a higher refractive index than the first curable material 6, start to diffuse into each other after the protrusions 35 have been formed in the dents 32. Due to this diffusion process and the different refractive indices, refractive index gradients are formed with the highest refractive indices at the locations of the centers of the dents 32 and the lowest refractive indices in the portions of the layer 31 of the first curable material 6 that are located between the dents 32. In this way the refractive microstructures 5' may be implemented as gradient index lenslets 5'. The gradient index lenslets 5' are indicated in FIG. 8 by the dotted areas where higher density of the dots represents a higher refractive index. FIG. 10 shows the refractive index distribution from the left to the right in FIG. 9. In practice, the gradient index lenslets 5' would protrude slightly from the surface as the time allowed for the first curable material 6 and the second curable material 16 to diffuse into each other is finite. As a consequence, the refractive properties of the refractive microstructures 5' are still determined by a small degree by their surface geometry in addition to being determined by the index gradient.

The slope of the refractive index gradient can be adjusted by the duration of the diffusion process, by the lateral dimensions of the dents 32 and by the amount of second curable material 16 printed into the dents 32. Moreover, the slope of the gradient determines the power of the gradient index lenslets 5' so that adjusting the duration of the diffusion process allows for adjusting the power of the gradient index lenslets 5'. Similar to stopping the coalescing process in the first to third exemplary embodiment, stopping the diffusion process in the present exemplary embodiment is achieved by pinning or curing the first and second curable materials 6, 16.

The use of gradient index lenslets 5' allows for forming a layer 31 with refractive microstructures 5' having a flat surface 3 or at least a surface that is flatter than a surface of a layer in which the refractive microstructures are solely based on the surface geometry of the refractive microstructures. This may be advantageous if further layers, like for example hard coating layers, transmission altering layers, antireflection layers, etc. shall be applied on top of the layer 31 with the refractive microstructures 5'. In particular, the flat surface can help to increase the adhesion and long-term stability of subsequent layers. The adhesion of the subsequent layers may be further improved if the layer 31 with the refractive microstructures 5' is not fully cured but only pinned.

FIG. 10 shows a sectional view of a spectacle lens 100 which has been manufactured according to the inventive method. The spectacle lens includes a spectacle lens body 3 and a layer 1 with refractive microstructures 5 which, in the present exemplary embodiment, provide a positive power in addition to the power of the spectacle lens body 3 through the curvature of their surface protruding from the layer 1. On top of the layer 1 with the protruding refractive microstructures 5, a layer 7 is present which is thick enough to level out the protrusions of the refractive microstructures 5. By this measure, a flat surface of the cover layer 7 can be achieved which is advantageous in view of the application of further layers on top of the cover layer. In particular, the flat surface of the cover layer 7 can help to increase the adhesion and long-term stability of subsequent layers. The spectacle lens (100) may either be a single vision, bifocal or multifocal spectacle lens, or a progressive addition lens (PAL).

The thickness of the layer 1 is 45 μm in the present exemplary embodiment, and the refractive microstructures 5 protrude from the layer 1 by an amount of approximately 1 μm. In order to achieve a flat surface, the cover layer 7 should have a thickness of about 5 to 10 times the height by which the refractive microstructures 5 protrude from the layer 11. In the present exemplary embodiment, the thickness of the cover layer 7 is 10 μm which corresponds to about 5 to 10 times the height by which the refractive microstructures 5 protrude from the layer 1. Onto the flat surface of the cover layer 7, a protective hard layer 101 is applied, and on top of the hard layer 101 an anti-reflection layer 103 is provided. Please note that also other layer systems could be provided on top of the cover layer 7, for example, layers with absorbing or reflecting properties, as they are used for sunglasses, for example.

Please note that the amount of elevation from the surface of the base layer 1 may be larger or smaller from 1 μm in other exemplary embodiments and may lie in the range between 0 and 10 μm depending, inter alia, on the power to be achieved with the refractive microstructures 5. An elevation of close to 0 μm would mean an almost flat surface of the base layer 1 with the refractive microstructures 5. Such a flat surface can be present if the refractive properties of the refractive microstructures 5 are due to a difference or a gradient in their refractive index instead of a curvature of their surfaces. If the refractive properties of the refractive microstructures 5 are to be achieved by means of their curvature, their protrusion from the surface lies in the range between 0.2 and 10 μm, and often in the range between 0.4 and 1.5 μm. To achieve a flat surface of the cover layer 7 the cover layer needs to have a thickness in the range between 1 and 50 μm, depending on the amount of protrusion of the refractive microstructures 5 from the base layer 1.

Figure 11:
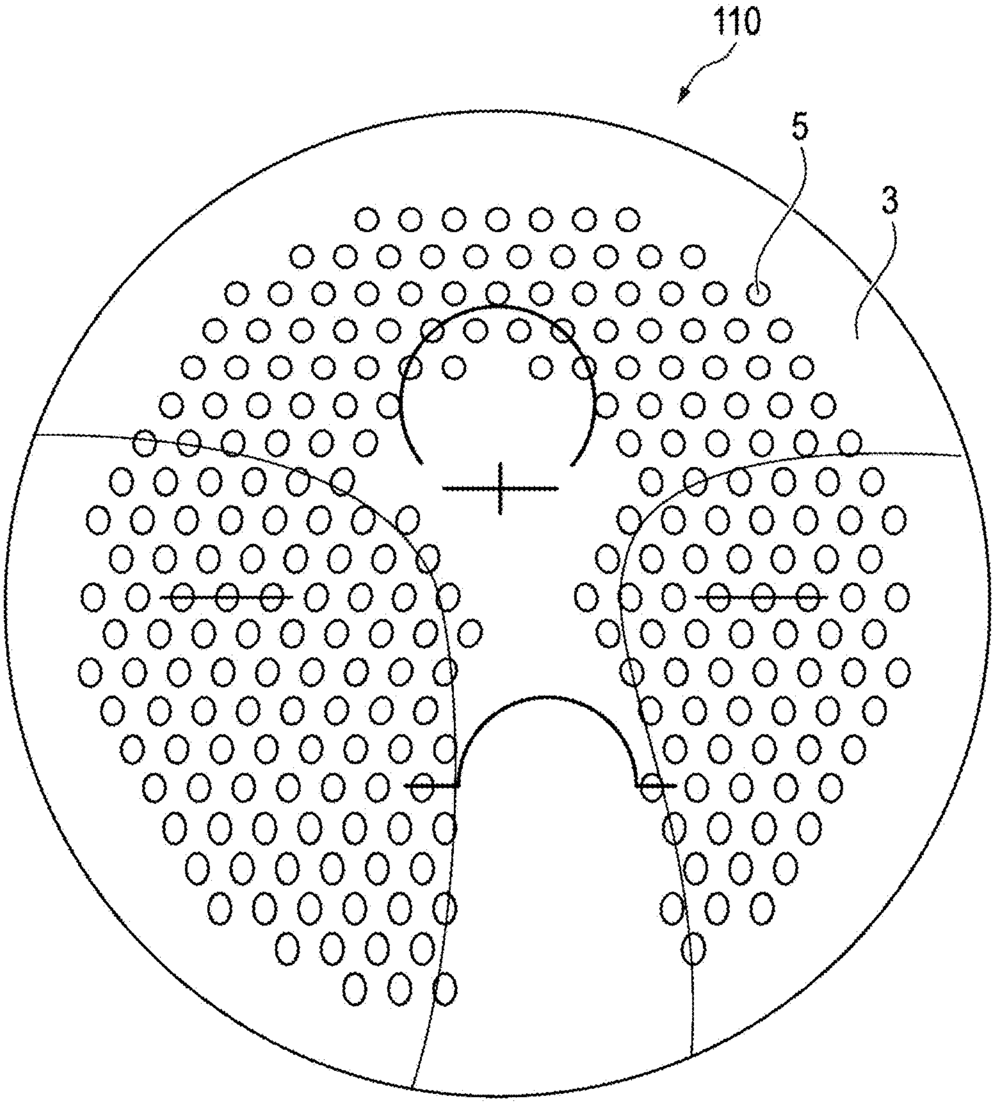
FIG. 11 shows a plan view of an exemplary embodiment of a spectacle lens manufactured according to the inventive method.

In the spectacle lens 100 shown in FIG. 11, the material, the protruding refractive microstructures 5 are made of, is identical with the material of the layer 1. This material has a refractive index that is the same as the refractive index of the material of the spectacle lens body 3. This means the refractive indices of the refractive microstructures 5 and the layer 1 do not differ by more than 5 parts per thousand, and typically by not more than one part per thousand, from the refractive index of the spectacle lens body 3. Typical materials that can be used as materials for the refractive microstructures 5 and the layer 1 have refractive indices between 1.30 and 1.75. Typical materials used for spectacle lens bodies have refractive indices in the range from 1.50 to 1.74. In order to provide a positive power in addition to the power of the spectacle lens body 3, the refractive microstructures 5 need to have a refractive index that is higher than the refractive index of the cover layer 7. Therefore, it is desirable to use a material with a refractive index at the upper end of the range between 1.30 and 1.75 for the layer 1 and the refractive microstructures 5 and a material with the refractive index at the lower end of the said the range for the cover layer 7. As the refractive index of the cover layer 7 is higher than the refractive index of air, steeper curvatures can be allowed for refractive microstructures having an interface to a cover layer 7 than for refractive microstructures 5 having an interface to air.

Although a particular combination of refractive indices is present in the exemplary embodiment shown in FIG. 10, other combinations of refractive indices are possible, as well. For example, as an alternative to the exemplary embodiment shown in FIG. 10, the refractive index of the refractive microstructures 5 could differ from the refractive index of the spectacle lens body 3. In particular, the refractive index of the refractive microstructures 5 could be larger than the refractive index of the spectacle lens body 3 which would reduce the steepness of curvature necessary for the refractive microstructures 5 to provide a positive power in addition to the power provided by the spectacle lens body 3. In addition, or as a further alternative, the refractive index of cover layer 7 could correspond to the refractive index of the spectacle lens body 3 or could be larger than the refractive index of the spectacle lens body 3. In case the layer 1 has the same refractive index as the spectacle lens body 3, a refractive index of the cover layer 7 that corresponds to the refractive index of the spectacle lens body 3 would prevent from unwanted refraction or Fresnel reflection at the interfaces between the spectacle lens body 3 and the layer 1 and between the layer 1 and the cover layer 7. However, in this case the refractive microstructures 5 need to have a refractive index that is higher than the refractive index of the cover layer 7 in order to provide a positive power in addition to the power of the spectacle lens body 3. In case the cover layer 7 has a refractive index that is higher than the refractive index of the spectacle lens body 3, providing an additional power in addition to the power of the spectacle lens body 3 would require complementary geometries of the base layer 1 with the refractive microstructures 5 or even inverted geometries, i.e., concave curvature such as dents or cups instead of a convex curvature. This alternative would, however, mainly be used if other powers then an additional power to the focal power provided by the spectacle lens body 3 are to be achieved. In addition, in case no cover layer 7 is present, the refractive index of the layer 1 could be smaller than that of the spectacle lens body 3 which could be beneficial if an antireflective layer is to be applied to the layer 1.

Although the refractive microstructures 5 of the spectacle lens 100 shown in FIG. 10 have refractive properties due to the geometry of the surface of protrusions over the layer 1 they could at least partly or even fully have refractive properties due to a gradient in the refractive index that is present in the refractive microstructures 5. Use of a gradient in the refractive index allows for a flatter surface of the layer 1 or even a fully flat surface of the layer 1 as compared to refractive microstructures 5 having refractive properties due to the geometry of protrusions protruding from the layer 1. However, the use of a gradient in the refractive index for providing the refractive properties of the refractive microstructures 5 requires using a second curable material having a refractive index that differs from the refractive index of the first curable material in the method of providing the refractive microstructures 5.

The refractive microstructures may have various shapes in a top view of the spectacle lens. FIG. 11, which shows a spectacle lens 110 manufactured according to the inventive method, represents a spectacle lens with refractive microstructures 5 which are formed as lenslets protruding from the layer 1 (not shown in FIG. 11). The spectacle lens body 3 is that of a progressive addition lens 110. However, it may as well be spectacle lens body 3 of a single vision, bifocal, or multifocal spectacle lens.

Figure 12:
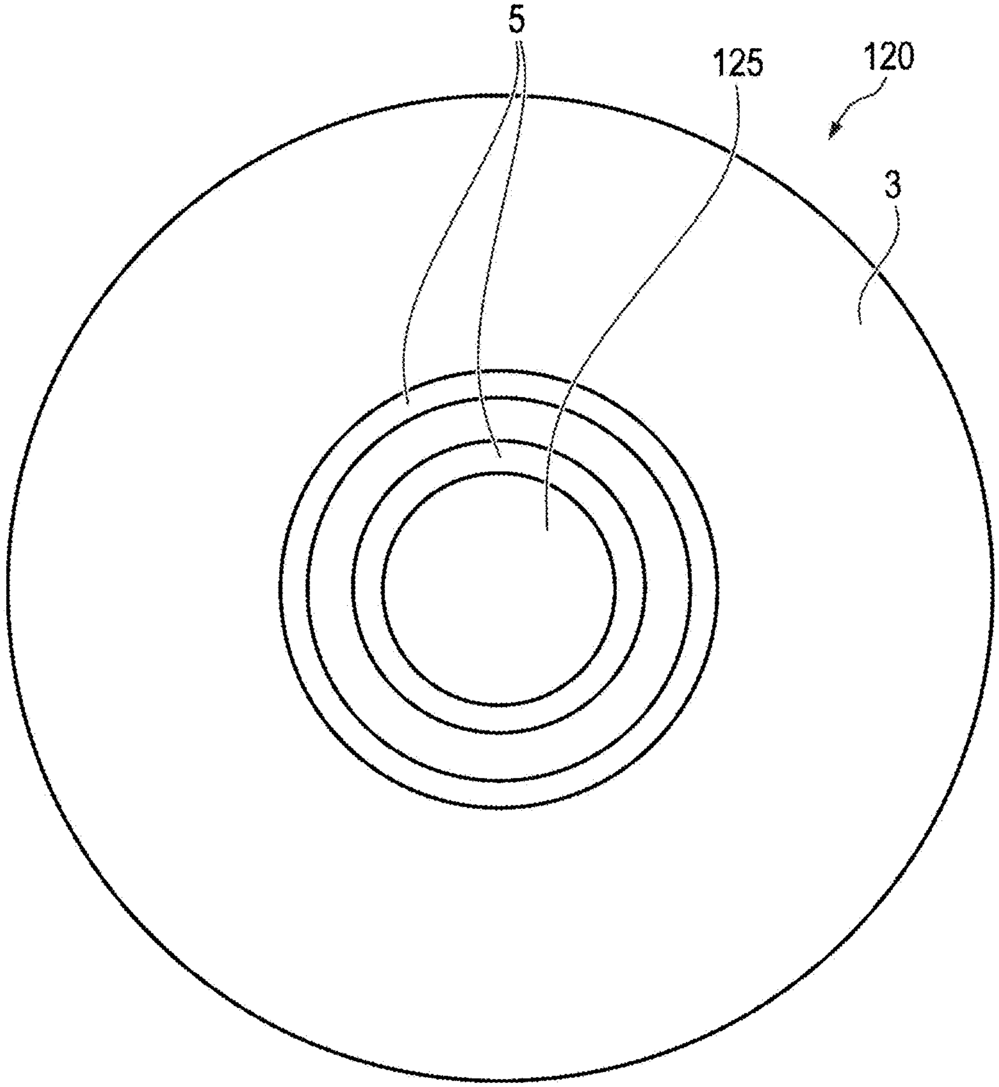
FIG. 12 shows a plan view of another exemplary embodiment of a spectacle lens manufactured according to the inventive method.

FIG. 12 shows another exemplary embodiment for spectacle lens 120 manufactured according to the inventive method with refractive microstructures 5. In this exemplary embodiment, the refractive microstructures 5 are provided on a spectacle lens body 3 of a single vision spectacle lens 120 and resemble rings having an approximately spherical curvature in radial direction and protrude from the layer 1 (not shown in FIG. 12). However, the refractive properties of a lenslet or ring do not need to be provided by the curvature of its surface, but may as well be provided by a difference or a gradient in the refractive index or by a combination of the curvature and the difference or the gradient in the refractive index. Depending on the material and the geometry of a lenslet, the refractive index within the lenslet may reduce or increase from the center of the lenslet towards its outer rim and, in a ring the refractive index, may reduce or increase starting from the center of the ring radially inwards and radially outwards. Other geometries of the refractive microstructures 5 in plan view of the spectacle lens 100 are conceivable for a person skilled in the art. Therefore, the geometry of the refractive microstructures 5 shall not be restricted to lenslets and ring-shaped microstructures. Although the spectacle lens body 3 of the spectacle lens 120 is that of a single vision spectacle lens, it could as well be a spectacle lens body 3 of a bifocal or multifocal lens or of a progressive addition lens.

In the following, concrete examples of the inventive method and their results will be discussed.

First Concrete Example

In the first concrete example, a pattern consisting of 3 refractive microstructures arranged in a 3×3 array on a 9 mm×9 mm area of a glass substrate (SCHOTT D263T eco) is formed. In a first step, a (meth)acrylate-based polymer ink is used to print a fluid base layer with the thickness of 45 μm onto the glass substrate in a first pass of the printing head using the print head of a standard 3D printer. The same (meth)acrylate-based polymer ink is then used to print a pattern of refractive microstructures onto the base layer in a second pass of the print head. The pattern consists of 9 microstructures arranged in a 3×3 array. Four of these patterns are printed in consecutive passes of the print head where each of these passes takes 12 seconds. Immediately after the last of the four patterns was printed, the four patterns are pinned by use of ultraviolet radiation with wavelengths of 365 nm and 395 nm in order to bring material flow to a halt while the substrate with the patterns is still in the printer. After that, the substrate with the patterns is taken out of the printer and cured under a nitrogen atmosphere using ultraviolet radiation having a wavelength of 365 nm.

As the pinning is performed immediately after the last pass of the print head, i.e., after the last one of the four patterns has been printed, the last pattern (fourth pattern) is pinned immediately after it has been printed while the third pattern has a waiting time of 12 seconds before pinning, the second pattern has a waiting time of 24 seconds before pinning and the first pattern has a waiting time of 36 seconds before pinning.

After the curing the refractive microstructures of the four patterns were evaluated for their diameter, for the amount of their protrusion from the base layer, for the radius of a sphere representing the best fit to the curvature of the microstructures and for the power they provide. The evaluation of the power is based on a refractive index of the (meth)acrylate-based polymer ink of 1.50. The results are compiled in the following Table 2:

| | Pattern no. | | | |
|---|---|---|---|---|
| | 1 | 2 | 3 | 4 |
| Time to pinning [s] | 36 | 24 | 12 | 0 |
| Diameter [mm] | 1.612 | 1.436 | 1.268 | 1.265 |
| Sphere radius [mm] | 419 | 343 | 211 | 188 |
| Elevation [μm] | 0.75 | 0.78 | 0.95 | 1.07 |
| Nominal Power [dpt] | 1.19 | 1.46 | 2.37 | 2.66 |

As can be seen from Table 2, the more time passes until pinning, the less the refractive microstructures protrude from the base layer. Likewise, the slope of the refractive microstructures and the power provided by the refractive microstructures decrease with the time that passes until pinning. On the other hand, the diameter of the sphere that represents the best fit to the curvature of the microstructures increases with time passing until pinning, as does the diameter of the refractive microstructures. This behavior is due to the coalescence of the printed refractive microstructures with the base layer over time.

Of the four patterns presented in Table 2, patterns number three and four show refractive microstructures having powers suitable for lenslets of spectacle lenses to be used for slowing down or stopping progression of myopia. The power of the refractive microstructures of the second pattern is a bit low but might still be suitable for lenslets of spectacle lenses to be used for slowing down or stopping progression of myopia while the power of the refractive microstructures of the first pattern is too low to be used as lenslets for spectacle lens which shall slow down or stop progression of myopia.

Furthermore, it could be observed that the coalescence of the refractive microstructures takes more time if the refractive microstructures within the pattern are located closer to each other. This might be due to the fact that the lateral material transport is hindered or affected by adjacent structures. Therefore, in case of refractive microstructures arranged close to each other, the time until the pinning needs to be longer than for refractive microstructures located further apart of each other.

Second Concrete Example

In the second concrete example, instead of lenslets, two concentric ring-shaped focusing structures are printed onto a base layer with the pinning starting immediately after printing the structures. The ink and the substrate used for printing the base layer and the refractive microstructures are the same as in the first concrete example. The radii of the resulting concentric inner and outer ring-shaped focusing structures after pinning and curing are 1.5 mm and 4.5 mm, respectively, and the distance between the two ring-shaped focusing structures is 3 mm. Their widths at their bases, i.e., where they merge with the base layer, are 1 mm for both ring-shaped focusing structures and they both protrude from the base layer with a height of 0.7 to 0.8 μm. It has been noticed that additional, unwanted rings may develop if the thickness of the base layer is the same as in the first concrete example. However, the unwanted rings seem to disappear if the thickness of the base layer is reduced.

The cross-section of the rings has been fitted by a sphere in order to calculate the approximate value of the power the ring-shaped focusing structures provide. Evaluation of the best fit results in a power of 4.5 dpt for a refractive index of 1.50, which is well within the range that can be used for slowing down or stopping progression of myopia.

Third Concrete Example

In the third concrete example, the layer and the refractive microstructures are printed both in a single pass of the print head. In doing so, the layer is printed in a pattern with dents into which the refractive microstructures are printed. Different (meth)acrylate-based polymer inks are used for printing the layer and the refractive microstructures. The substrate is the same as in the first two exemplary embodiments. In the present concrete example, the ink used for printing the layer with the dents has a first refractive index and the ink used for printing the refractive microstructures into the dents has a second refractive index that is higher than the first refractive index. Over time, a diffusion of the ink of the layer and the ink of the refractive microstructures takes place, leading to a gradient in the refractive index with the highest refractive index at the center of the refractive microstructures and the lowest refractive index in the area between neighboring refractive microstructures.

Fourth Concrete Example

In the fourth concrete example, refractive microstructures are printed onto a curved substrate that does not have a hard coating and has a diameter of 65 mm, a center thickness of 2.0 mm, a radius of curvature of 143.5 mm, a refractive index of 1.50 and a power of 0.00 dpt. Both, lenslets and ring-shaped focusing structures were printed onto the surface of such a substrate. For printing the lenslets, the same procedure as for pattern four in the first concrete example was used and for printing ring-shaped focusing structures the same procedure as in the second concrete example was used.

In case of the ring-shaped focusing structures, two concentric ring-shaped focusing structures were printed. These ring-shaped focusing structures protrude from the base layer with a height of 2 to 2.5 μm with the outer one of the two ring-shaped focusing structures protruding slightly less than the inner one and having a slightly smaller width. From a fit of spheres to the cross-section of the ring-shaped focusing structures powers of the rings between 3.4 dpt and 6.5 dpt has been determined.

In case of printing lenslets, the resulting lenslets have a diameter of 2.54 mm and an elevation of 7.24 μm. From a fit of a sphere to the curvature of the lenslets the radius of curvature was determined to be 111.8 mm which results in a power of 4.5 dpt.

The fourth concrete example shows that with the inventive method lenslets and ring-shaped focusing structures can be printed on curved substrates with the lenslets and the ring-shaped focusing structures having suitable powers for slowing down or stopping progression of myopia.

The present invention has been described with respect to exemplary embodiments and concrete examples of the inventive method and the resulting spectacle lens designs. Guided by the exemplary embodiments and the concrete examples, a person skilled in the art is able to contemplate modifications of the inventive method and the inventive spectacle lens design. Therefore, the scope of the disclosure shall not be restricted by the exemplary embodiments or the concrete examples but only by the appended claims.

The term comprising (and its grammatical variations) as used herein is used in the inclusive sense of having or including and not in the exclusive sense of consisting only of. The terms a and the as used herein are understood to encompass the plural as well as the singular.

All publications, patents, and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method of providing refractive microstructures on a surface of a spectacle lens body in which the refractive microstructures are formed on the surface by an additive manufacturing process, in which the refractive microstructures are formed by applying a curable material selected from the group consisting of a liquid or viscous curable material and curing the curable material, wherein the additive manufacturing process comprises:

forming a layer of a first curable material;

applying an additional amount of the first curable material or an amount of a second curable material of the curable material at locations at which the refractive microstructures shall be formed before curing or pinning the layer of the first curable material to form protrusions with an initial curvature prior to the curing or pinning;

flattening the initial curvature by a material transport process;

commencing curing or pinning of the layer of the first curable material with the additional amount of the first curable material or with the amount of the second curable material after the protrusions are initially formed while the initial curvature flattens and before the protrusions have completely coalesced by material transport processes within the liquid or viscous material in the layer of the first curable material;

finally forming the refractive microstructures by achieving a final curvature of the protrusions as a flattened curvature by stopping a flattening of the curvature by a controlled increase in viscosity of the curable material, the initial curvature being greater than the final curvature.

2. The method as claimed in claim 1, wherein the amount of the first curable material that is applied to the locations of the surface of the spectacle lens body where the refractive microstructures shall be formed is less than the amount of the first curable material that is applied to other locations, and the amount of the second curable material is applied to the locations where the refractive microstructures shall be formed.

3. The method as claimed in claim 1, wherein the layer of the first curable material with the additional amount of the first curable material or with the amount of the second curable material is formed by applying, in a first step of the additive manufacturing process, a continuous base layer to the surface of the spectacle lens body by use of the first curable material and then adding, in a second step of the additive manufacturing process, the additional amount of the first curable material or the amount of the second curable material to the base layer at the locations where the refractive microstructures shall be formed while the first curable material of the base layer is not yet cured or pinned.

4. The method as claimed in claim 1, wherein for forming the refractive microstructures the amount of the second curable material is applied at the locations at which the refractive microstructures shall be formed before curing or pinning and the first curable material and the second curable material have different refractive indices, respectively.

5. The method as claimed in claim 4, wherein a refractive index of the first curable material is smaller than the refractive index of the second curable material.

6. The method as claimed in claim 4, wherein the power of the refractive microstructures are at least partly determined by a degree by which the first curable material and the second curable material are interdiffused until the layer of the first curable material with the amount of the second curable material is cured or pinned.

7. The method as claimed in claim 1, wherein for forming the refractive microstructures the amount of the second curable material is applied at the locations at which the refractive microstructures shall be formed before curing or pinning and the first curable material and the second curable material have a same refractive index.

8. The method as claimed in claim 1, wherein a cover layer of a cover layer material is applied onto the layer of the first curable material with the additional amount of the first curable material or with the amount of the second curable material.

9. The method as claimed in claim 8, wherein the cover layer is applied after curing or pinning the layer of the first curable material with the additional amount of the first curable material or with the amount of the second curable material.

10. The method as claimed in claim 8, wherein the power of the refractive microstructures is at least partly determined by a ratio of the refractive index of the cover layer material to the refractive index of the first curable material or the second curable material.

11. The method as claimed in claim 8, wherein the refractive index of the cover layer material is smaller than the refractive index of the first curable material or the second curable material.

12. The method as claimed in claim 1, wherein at least one of the following parameters is used for setting the power of the refractive microstructures:

a time after which the curing or pinning is started;

the time given for the first curable material to cure or be pinned after the curing or pinning is started or the time given for the first curable and the second curable material to cure or be pinned after the curing or pinning is started;

the additional amount of the first curable material or the amount of the second curable material applied at the locations where the refractive microstructures shall be formed;

rheological properties of the first curable material or the rheological properties of the first curable and the second curable material;

a combination of surface energies of the first curable material and the material of the spectacle lens body or the combination of surface energies of the first curable material and the second curable material and the material of the spectacle lens body;

a combination of surface tensions of the first curable material and the second curable material;

a convection speed of the first curable material or the convection speed of the first curable material and the second curable material;

temperature differences during the additive manufacturing process;

a temperature of a nozzle arrangement during the additive manufacturing process;

the temperature of the spectacle lens body during the additive manufacturing process;

an atmospheric temperature during the additive manufacturing process;

an atmospheric moisture during the additive manufacturing process;

an atmospheric composition during the additive manufacturing process;

a strength of external electric or magnetic fields present during the additive manufacturing process:

a density of the first curable material or the densities of the first curable material and the second curable material; and a chemical composition of the first curable material or the chemical compositions of the first curable material and the second curable material.

13. The method as claimed in claim 1, wherein a surfactant is added to at least one of the first curable material and the second curable material.

14. The method as claimed in claim 1, wherein at least one of the first curable material and the second curable material has the same refractive index as the material of the spectacle lens body.

15. The method as claimed in claim 1, wherein at least one of the refractive index of the first curable material and the refractive index of the second curable material is larger than the refractive index of the material of the spectacle lens body.

16. The method as claimed in claim 1, wherein the layer of the first curable material with the additional amount of the first curable material or with the amount of the second curable material is formed on a surface of a progressive addition lens.

17. The method as claimed in claim 1, wherein the increase in viscosity is controlled by reducing an intensity and/or a duration of electromagnetic radiation and/or heat.

18. The method as claimed in claim 1, wherein the increase in viscosity is controlled by an amount of oxygen in a surrounding atmosphere.

19. A method of providing refractive microstructures on a surface of a spectacle lens body in which the refractive microstructures are formed on the surface by an additive manufacturing process, in which the refractive microstructures are formed by applying a curable material selected from the group consisting of a liquid or viscous curable material and curing the curable material, wherein the additive manufacturing process comprises:

forming a layer of a first curable material of the curable material;

applying an additional amount of the first curable material or an amount of a second curable material of the curable material at locations at which the refractive microstructures shall be formed before curing or pinning the layer of the first curable material to form protrusions with an initial curvature prior to the curing or pinning;

flattening the initial curvature by a material transport process;

commencing curing or pinning of the layer of the first curable material with the additional amount of the first curable material or with the amount of the second curable material after the protrusions are initially formed while the initial curvature flattens and before the protrusions have completely coalesced by material transport processes within the liquid or viscous material in the layer of the first curable material;

controlling a time until the pinning or curing starts and the time given for pinning or curing the material of the layer of the first curable material and the protrusions; and finally forming the refractive microstructures by achieving a final curvature of the protrusions as a flattened curvature by stopping a flattening of the curvature by a controlled increase in viscosity of the curable material, the initial curvature being greater than the final curvature.

20. A method of providing refractive microstructures on a surface of a spectacle lens body in which the refractive microstructures are formed on the surface by an additive manufacturing process, in which the refractive microstructures are formed by applying a curable material selected from the group consisting of a liquid or viscous curable material and curing the curable material, wherein the additive manufacturing process comprises:

forming a layer of a first curable material of the curable material;

applying an additional amount of the first curable material or an amount of a second curable material of the curable material at locations at which the refractive microstructures shall be formed before curing or pinning the layer of the first curable material to form protrusions with an initial curvature prior to the curing or pinning;

flattening the initial curvature by a material transport process;

commencing curing or pinning of the layer of the first curable material with the additional amount of the first curable material or with the amount of the second curable material after the protrusions are initially formed while the initial curvature flattens and before the protrusions have completely coalesced by material transport processes within the liquid or viscous material in the layer of the first curable material;

and finally forming the refractive microstructures by achieving a final curvature of the protrusions as a flattened curvature by stopping the material transport processes by a controlled increase in viscosity of the curable material, the initial curvature being greater than the final curvature.

* * * * *